US012501214B2

(12) United States Patent
Dickson et al.

(10) Patent No.: US 12,501,214 B2
(45) Date of Patent: Dec. 16, 2025

(54) AUDIO SYSTEM

(71) Applicant: Nuheara IP Pty Ltd, Northbridge (AU)

(72) Inventors: Bonar Dickson, Avalon Beach (AU); Erik Östlin, Hamilton Hill (AU); Pei Chee Yong, Cannington (AU); Amit Malegaonkar, Yokine (AU); Peter Mather Combes, Floreat (AU); Alan Davis, Riverton (AU)

(73) Assignee: Nuheara IP Pty Ltd, Northbridge (AU)

( * ) Notice: Subject to any disclaimer, the term of this patent is extended or adjusted under 35 U.S.C. 154(b) by 147 days.

(21) Appl. No.: 18/132,616

(22) Filed: Apr. 10, 2023

(65) Prior Publication Data

US 2023/0328435 A1 Oct. 12, 2023

(30) Foreign Application Priority Data

Apr. 12, 2022 (AU) ................................ 2022900971

(51) Int. Cl.

*H04R 3/04* (2006.01)
*H04R 1/10* (2006.01)
*H04R 29/00* (2006.01)

(52) U.S. Cl.

CPC ............. *H04R 3/04* (2013.01); *H04R 1/1083* (2013.01); *H04R 1/1091* (2013.01); *H04R 29/00* (2013.01); *H04R 2460/01* (2013.01)

(58) Field of Classification Search

CPC ...... H04R 3/04; H04R 1/1083; H04R 1/1091; H04R 29/00; H04R 2460/01; H04R 1/1016; H04R 29/001; H04R 2460/15; H04R 25/30; H04R 2460/11

USPC ........................................ 381/74, 71.6, 328

See application file for complete search history.

(56) References Cited

U.S. PATENT DOCUMENTS

| | | | | |
|---|---|---|---|---|
| 9,543,975 | B1 * | 1/2017 | Melanson | H04R 3/04 |
| 11,470,413 | B2 * | 10/2022 | Andersen | H04R 1/1041 |
| 2010/0027823 | A1 * | 2/2010 | Arndt | H04R 25/305 381/318 |
| 2015/0010158 | A1 * | 1/2015 | Broadley | A61F 11/14 381/58 |

(Continued)

OTHER PUBLICATIONS

International Type Search report issued for Australian Patent Application No. 2022900971, dated May 24, 2022.

*Primary Examiner* — Xu Mei
(74) *Attorney, Agent, or Firm* — Andrus Intellectual Property Law, LLP

(57) ABSTRACT

An audio system has a speaker port defining a speaker port cavity, which has a speaker port outlet communicating acoustically with a user's ear canal. A speaker generates output sound in the speaker port cavity based on a speaker signal received at the speaker. The output sound travels along an acoustic path extending from the speaker through the speaker port outlet to an ear canal. A speaker port microphone in acoustic communication with the speaker port cavity produces a speaker port microphone signal in response to input sound. An analysis unit receives the speaker signal and the speaker port microphone signal, uses the speaker signal and the speaker port microphone signal to determine a change in acoustic properties of the acoustic path, and uses the determined change in acoustic properties of the acoustic path to determine a change in physical properties of the audio system along the acoustic path.

33 Claims, 27 Drawing Sheets

(56) References Cited

U.S. PATENT DOCUMENTS

| | | | | |
|---|---|---|---|---|
| 2015/0172829 | A1 | 6/2015 | Droste et al. | |
| 2017/0148428 | A1* | 5/2017 | Thuy | H04R 1/1083 |
| 2018/0270564 | A1 | 9/2018 | Kumar et al. | |
| 2019/0246217 | A1* | 8/2019 | Miller | H04R 25/353 |
| 2020/0007995 | A1 | 1/2020 | Pedersen et al. | |
| 2020/0162808 | A1 | 5/2020 | Monsarrat-Chanon et al. | |

* cited by examiner

550

AUDIO SYSTEM

CROSS REFERENCE TO RELATED APPLICATION

The present application claims priority to Australian Patent Application No. 2022900971, filed Apr. 12, 2022, which is hereby incorporated herein by reference in entirety.

FIELD

The disclosure relates to an audio system and an associated method of operating the audio system.

BACKGROUND

The quality of audio played through audio reproducing devices, including headphones, earphones, earbuds and similar audio devices, is dependent on a number of factors. One such factor is that a change to physical properties of the audio system along an audio path between a speaker of the audio device and a user's ear drum can have a significant effect on audio quality. For example, presence of foreign matter in the audio path can severely affect sound magnitude and therefore audibility of the sound by a user. Notwithstanding this issue, a user may not appreciate that the audio quality has significantly changed and may not be aware that the audio device fit is poor or that foreign matter is present in the device.

It is to be understood that if any prior publication is referred to herein, such reference does not constitute an admission that the publication forms part of the common general knowledge in the art, in Australia, or any other country.

SUMMARY

In accordance with a first aspect of the present invention, there is provided an audio system comprising:

- a speaker port defining a speaker port cavity, the speaker port having a speaker port outlet that during use communicates acoustically with an ear canal of a user;
- a speaker arranged to generate output sound in the speaker port cavity based on a speaker signal received at the speaker, the output sound travelling along an acoustic path that extends from the speaker through the speaker port outlet to an ear canal during use;
- a speaker port microphone in acoustic communication with the speaker port cavity, the speaker port microphone producing a speaker port microphone signal in response to input sound received at the speaker port microphone; and
- an analysis unit configured to receive the speaker signal and the speaker port microphone signal, to use the speaker signal and the speaker port microphone signal to determine a change in acoustic properties of the acoustic path, and to use the determined change in acoustic properties of the acoustic path to determine a change in physical properties of the audio system along the acoustic path.

In an embodiment, the analysis unit is configured to use the speaker signal and the speaker port microphone signal to determine acoustic condition data indicative of a change in a transfer function associated with the speaker signal and the speaker port microphone signal.

In an embodiment, the acoustic condition data is determined by:

- determining a reference transfer function indicative of expected changes between the speaker signal and the speaker port microphone signal in normal operating conditions of the audio system;
- determining a current transfer function indicative of current changes between the speaker signal and the speaker port microphone signal; and
- determining a difference between the current transfer function and the reference transfer function.

In an embodiment, the acoustic condition data is determined by:

- determining a compensation speaker port microphone signal indicative of expected components of the speaker port microphone signal that are associated with expected transfer function components in normal operating conditions of the audio system;
- filtering the speaker port microphone signal using the compensation speaker port microphone signal to produce a filtered speaker port microphone signal; and
- determining a difference between the filtered speaker port microphone signal and the speaker signal.

In an embodiment, the acoustic condition data is determined by:

- determining a compensation speaker signal indicative of expected changes to the sound output by the speaker according to an expected transfer function in normal operating conditions of the audio system;
- filtering the speaker signal using the compensation speaker signal to produce a filtered speaker signal; and
- determining a difference between the speaker port microphone signal and the filtered speaker signal.

In an embodiment, the acoustic condition data includes data indicative of a change in magnitude of at least one frequency component of the transfer function.

In an embodiment, the acoustic condition data includes data indicative of a change in phase of at least one frequency component of the transfer function.

In an embodiment, the analysis unit is configured to select at least one frequency of the speaker signal and the speaker port microphone signal and to use the selected at least one frequency of the speaker signal and the speaker port microphone signal to determine a change in acoustic properties of the audio system.

In an embodiment, the audio system is arranged to determine a speaker port microphone signal-to-noise ratio and to use the determined signal-to-noise ratio to select the at least one frequency of the speaker signal to use to determine the change in acoustic properties of the audio system.

In an embodiment, the at least one frequency used to determine the change in magnitude of at least one frequency component of the transfer function includes a frequency range of about 3-8 kHz or a frequency range less than about 2 kHz.

In an embodiment, the at least one frequency used to determine the change in phase of at least one frequency component of the transfer function includes a frequency range of about 6-10 kHz or a frequency range less than about 5 kHz.

In an embodiment, the change in physical properties of the audio system along the acoustic path is indicative of presence of foreign matter in an acoustic path that includes the speaker port cavity.

In an embodiment, the audio system ordinarily includes at least one filter in an acoustic path that includes the speaker port cavity, and the change in physical properties of the audio system along the acoustic path is absence of the filter.

In an embodiment, the analysis unit is configured to use the speaker signal and the speaker port microphone signal to determine a change in acoustic properties of the audio system is indicative of quality of fit between the audio system and a user's ear.

In an embodiment, the speaker signal is indicative of a defined probe sound.

In an embodiment, the speaker signal is indicative of sound produced by the speaker during normal use of the audio system.

In an embodiment, the audio system comprises at least one external microphone arranged to produce an external microphone signal indicative of environmental sound adjacent and external to the audio system.

In an embodiment, the system is arranged to determine quality of fit between the audio system and a user's ear by determining a difference between a high frequency response to the environmental sound at the external microphone and a high frequency response to the environmental sound at the speaker port microphone.

In an embodiment, the system is arranged to determine quality of fit between the audio system and a user's ear by determining a response to a high frequency sound probe generated at the speaker, the response determined at the external microphone in relatively quiet conditions.

In an embodiment, the speaker port microphone signal-to-noise ratio is determined using the external microphone signal produced by at least one external microphone.

In accordance with a second aspect of the present invention, there is provided an in-ear, on-ear or over-ear audio reproducing device including an audio system according to the first aspect.

In accordance with a second aspect of the present invention, there is provided a method of determining a change in physical properties of an audio system, the audio system including:

- a speaker port defining a speaker port cavity, the speaker port having a speaker port outlet that during use communicates acoustically with an ear canal of a user;
- a speaker arranged to generate output sound in the speaker port cavity based on a speaker signal received at the speaker, the output sound travelling along an acoustic path that extends from the speaker through the speaker port outlet to an ear canal during use; and
- a speaker port microphone in acoustic communication with the speaker port cavity, the speaker port microphone producing a speaker port microphone signal in response to input sound received at the speaker port microphone;

the method comprising:

- receiving the speaker signal and the speaker port microphone signal;
- using the speaker signal and the speaker port microphone signal to determine a change in acoustic properties of the acoustic path; and
- using the determined change in acoustic properties of the audio system to determine a change in physical properties of the audio system along the acoustic path.

In this specification, the term audio system includes an audio reproducing device that is disposed during use in, on or adjacent a user's ear canal, and that includes an arrangement for determining a change in acoustic properties of the audio reproducing device.

Example audio reproducing devices include headphones, earphones, earbuds and similar audio devices, and telephones including smart phones.

BRIEF DESCRIPTION OF FIGURES

Embodiments will now be described by way of example only with reference to the accompanying non-limiting figures, in which.

DETAILED DESCRIPTION

Figure 1:
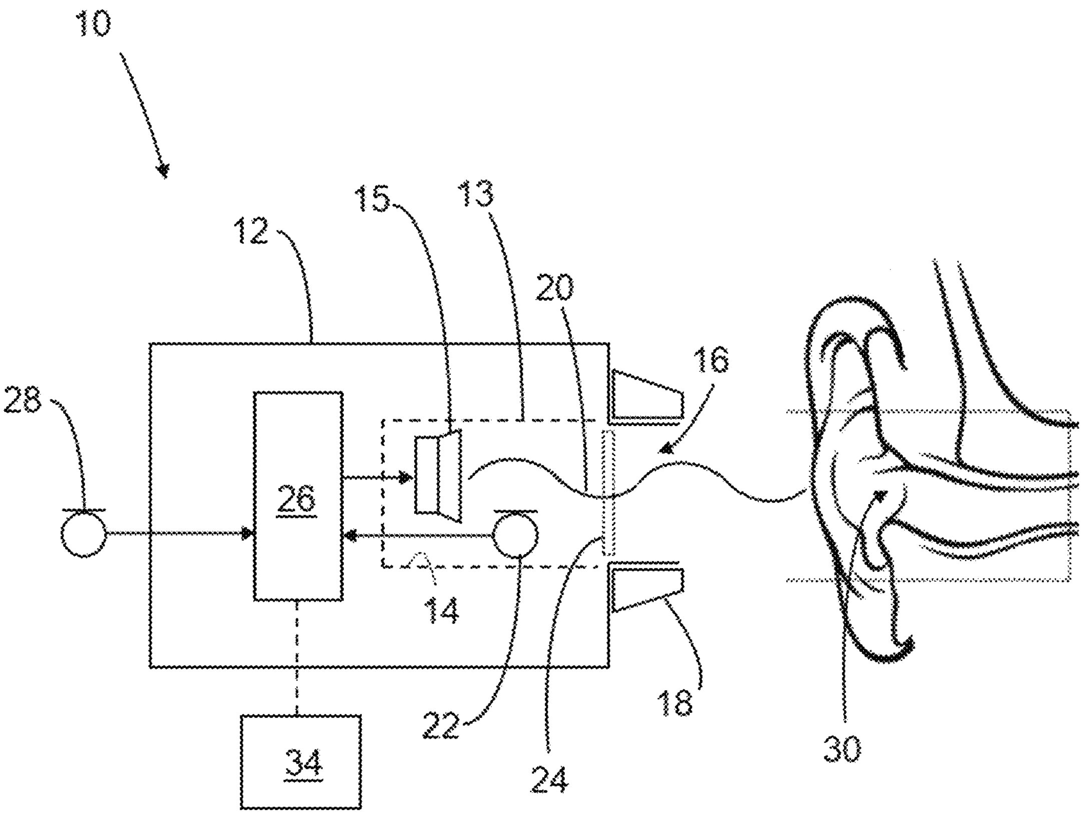
FIG. 1 is a schematic representation of an embodiment of an audio system.

Referring to FIG. 1, there is shown a representation of an embodiment of an audio system 10, in this example implemented as an earbud.

Although the present example is described in relation to an earbud, it will be understood that other implementations are envisaged. For example, the audio system 10 may be implemented in other audio reproducing devices such as headphones or earphones.

The audio system 10 has an earbud body 12 that houses a speaker port 13, the speaker port 13 defining a speaker port cavity 14.

A speaker 15 is in acoustic communication with the speaker port cavity 14, in this example by disposing the speaker 15 in the speaker port cavity 14, and an outlet 16 of the speaker port 13 is provided with an acoustic filter 24, in this example in the form of a mesh. The speaker 15 receives a speaker signal and produces sound representative of the speaker signal. In this example, a flexible ear tip 18 is provided at the outlet 16 to form a seal during use with a user's ear canal. The ear tip 18 may be replaceable.

In the present example, the filter 24 is disposed at the outlet 16, although it will be understood that other locations in the acoustic path 20 are envisaged. The filter 24 is not required in all embodiments.

During use, when the audio system 10 is worn by a user, a seal is desirably formed between the user's ear canal and the ear tip 18, and an acoustic path 20 is defined between the speaker 15 and the user's eardrum (not shown).

The system 10 also has a speaker port microphone 22 in acoustic communication with the speaker port cavity 14, in this example by locating the speaker port microphone 22 in the speaker port cavity 14. The speaker port microphone 22 produces a speaker port microphone signal representative of sound received at the speaker port microphone 22.

During use, sound generated by the speaker 15 in the speaker port cavity 14 is received by the speaker port microphone 22. However, because of the physical and acoustic properties of the speaker port 13, the sound received by the speaker port microphone 22 is different to the sound generated by the speaker 15, for example because of acoustic damping, sound leakage and/or ingress of sound into the speaker port cavity 14 from the external environment. Such differences between generated and received sound can be represented by a sound transfer function $H_{yu}$. In normal circumstances, an expected sound transfer function $H_{yu}$ will exist that is representative of expected changes between the generated and received sound.

However, in abnormal circumstances, for example wherein foreign matter such as earwax is present in the speaker port 13 or on the filter 24, the filter 24 is absent, or a weak seal exists between the ear tip 18 and a user's ear canal, significant changes occur to the expected transfer function $H_{yu}$. Such changes can be used to make determinations in relation to the operational condition of the earbud.

For example:

i) Blockages or obstructions at the speaker port outlet 16, for example due to accumulation of cerumen (earwax) on the filter 24 (speaker port mesh), cause a change to the physical properties of the audio system along the acoustic path 20 and this can have a severe effect on sound magnitude and therefore audibility of the sound by a user. When this occurs, the speaker output apparent to the user progressively reduces as the amount of earwax at the speaker port outlet 16 increases.

ii) A missing filter 24 on the outlet 16 causes a change to the physical properties of the audio system along the acoustic path 20 and this can affect acoustic damping and cause changes to the frequency spectrum received at the user's eardrum. An absence of the filter 24 can also negatively affect acoustic feedback and cause excessively high frequencies in the sound received at the user's ear drum.

iii) Changes in ear tip or deterioration of ear tip quality can cause significant changes in the fit of the earbud in the user's ear canal and consequently egress of sound from the audio path, ingress of sound into the audio path from the external environment, a change in sound equalisation and a reduction in sound quality for the user.

The sound received by the speaker port microphone 22 includes sound that has been modified in an expected way by the physical and acoustic properties of the audio system 10, and any modifications to the sound that are attributable to abnormal features, including changes to the physical properties of the audio system along the acoustic path 20 such as the presence of foreign matter in the acoustic path and/or absence of the filter 24, and/or changes to the quality of fit between the ear tip 18 and the user's ear canal.

The present audio system 10 is arranged to make determinations in relation to abnormal changes in sound reproduction based on determined changes to the sound transfer function $H_{yu}$. For this purpose, the audio system 10 includes an analysis unit 26 that receives the speaker signal and the speaker port microphone signal and in response produces acoustic condition data indicative of changes to the sound transfer function compared to a reference normal transfer function. The acoustic condition data is usable to identify an abnormal condition. A deviation of the acoustic condition data based on defined criteria may be indicative of presence of foreign matter in the audio path between the speaker 15 and the user's ear drum, absence of the filter 24 and/or a poor fit between the user's ear canal and the ear tip 18.

Figure 2:
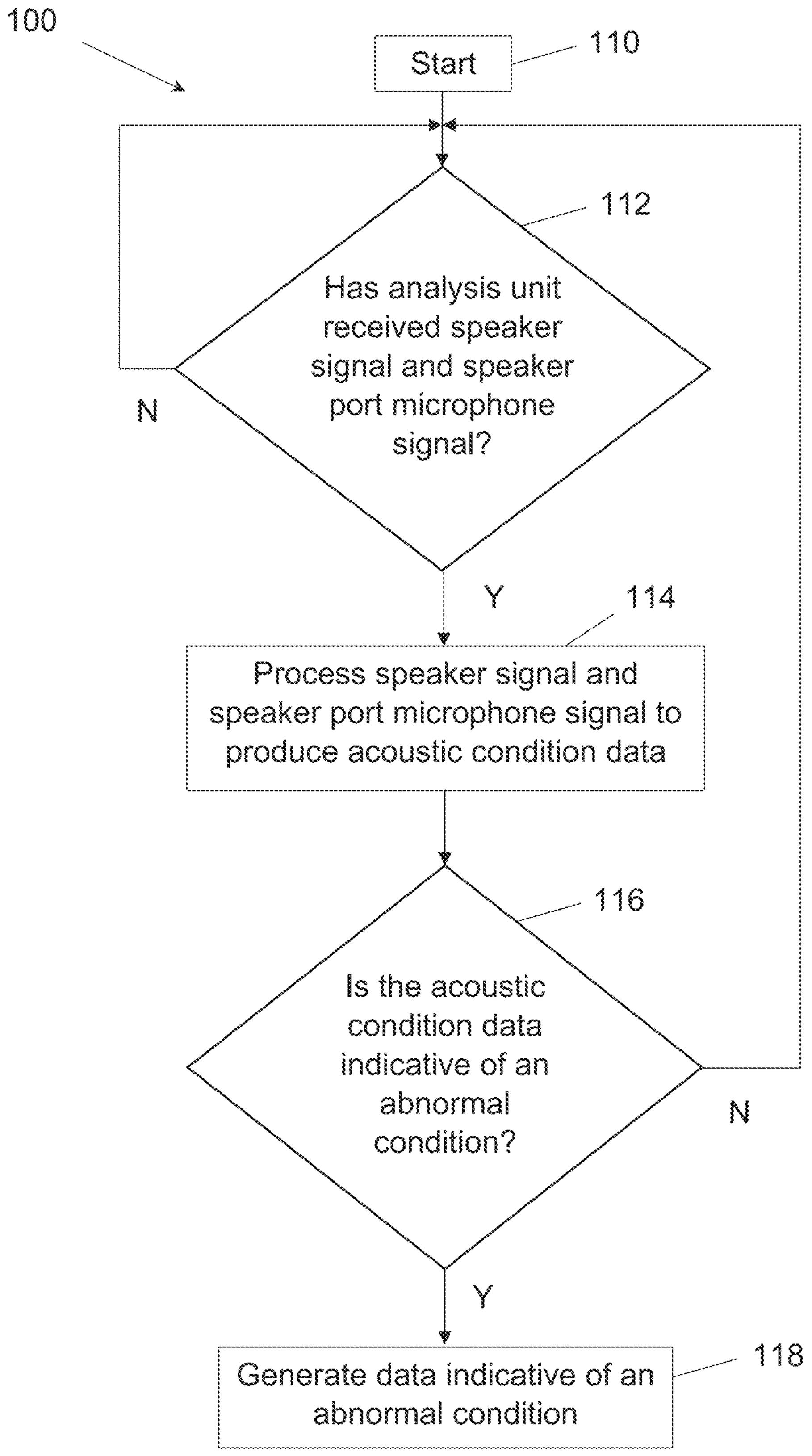
FIG. 2 shows a process flow implemented by the audio system shown in FIG. 1.

General functionality of the analysis unit 26 is shown in process flow diagram 100 in FIG. 2. In use, the analysis unit 26 first determines at step 112 if it has received the speaker signal and the speaker port microphone signal and, if so, the analysis unit 26 uses the speaker signal and the speaker port microphone signal to generate the acoustic condition data. If the analysis unit 26 has not received the speaker signal and the speaker port microphone signal, the process flow reverts to the start at step 110.

When the acoustic condition data is generated, it is used at step 116 to determine whether an abnormal condition exists based on reference acoustic condition data. If the acoustic condition data is indicative of an abnormal condition, the analysis unit 26 determines the abnormal earbud condition, and for example sends an alert signal, as indicated at step 118, to a management system 34 to log that an abnormal earbud condition exists.

In an embodiment, the abnormal condition data may be communicated to a user through the management system 34 that for example may be implemented as a software application, for example implemented on a computing device that may include a personal computer, laptop computer, smartphone or tablet computer. The management application 34 in this example is in wireless communication with the analysis unit 26 and the management application 34 may communicate with a cloud-based database arranged to store acoustic condition data associated with the audio system 10.

In the present embodiment, the audio system 10 is also arranged to provide hearing assistance functionality, user selectable modification of the type and amount of sound that is passed to the user from the external environment, and active noise cancellation (ANC) functionality, and for this purpose the audio system 10 includes at least one external microphone 28. In the present example, two external microphones are provided. Each additional microphone 28 receives a background acoustic signal associated with the environment adjacent the earbud body 12. The additional microphone(s) 28 can provide additional parameters to assist in determining the acoustic condition data more accurately.

Changes to the transfer function $H_{yu}$ can be determined in any suitable way.

For example, a sound transfer function $H_{yu}$ based on an obtained speaker signal y(n) and an obtained sound port microphone signal u(n) may be produced and compared with a reference sound transfer function $H_{yu}$(ref), and acoustic condition data in the form of a difference signal $\Delta H_{yu}$ then used to make determinations in relation to operation of the earbud.

Alternatively, a reference microphone signal may be subtracted from the obtained sound port microphone signal u(n) to produce a filtered sound port microphone signal, and the filtered sound port microphone signal compared with the speaker signal y(n) to produce acoustic condition data in the form of a difference signal s, which is then used to make determinations in relation to operation of the earbud. In this example, the reference microphone signal is indicative of expected components of a sound port microphone signal that are associated with expected sound transfer function components when the earbud is operating normally, for example in the absence of foreign material, a missing filter 24 and/or a poor ear tip fit. The reference microphone signal may also include variable components based on detected in-ear fit variations or other factors, such as associated with audio received from the external environment by the external microphone(s) 28.

However, it will be understood that other methodologies may be used for determining changes in sound transfer function compared to a reference normal transfer function, and providing acoustic condition data indicative of the transfer function changes.

It will be understood that the speaker signal y(n) supplied to the speaker 15 may be a defined signal arranged to generate a defined sound (referred to as a 'probe') used for the self-assessment analysis process only, or the speaker signal y(n) may correspond to sound to be reproduced by the audio system during normal use.

Earbud Speaker Port Acoustic Modelling

The earbud speaker port 13 and associated acoustic environment can be modelled using a suitable acoustic modelling tool, such as ARES.

Figure 3:
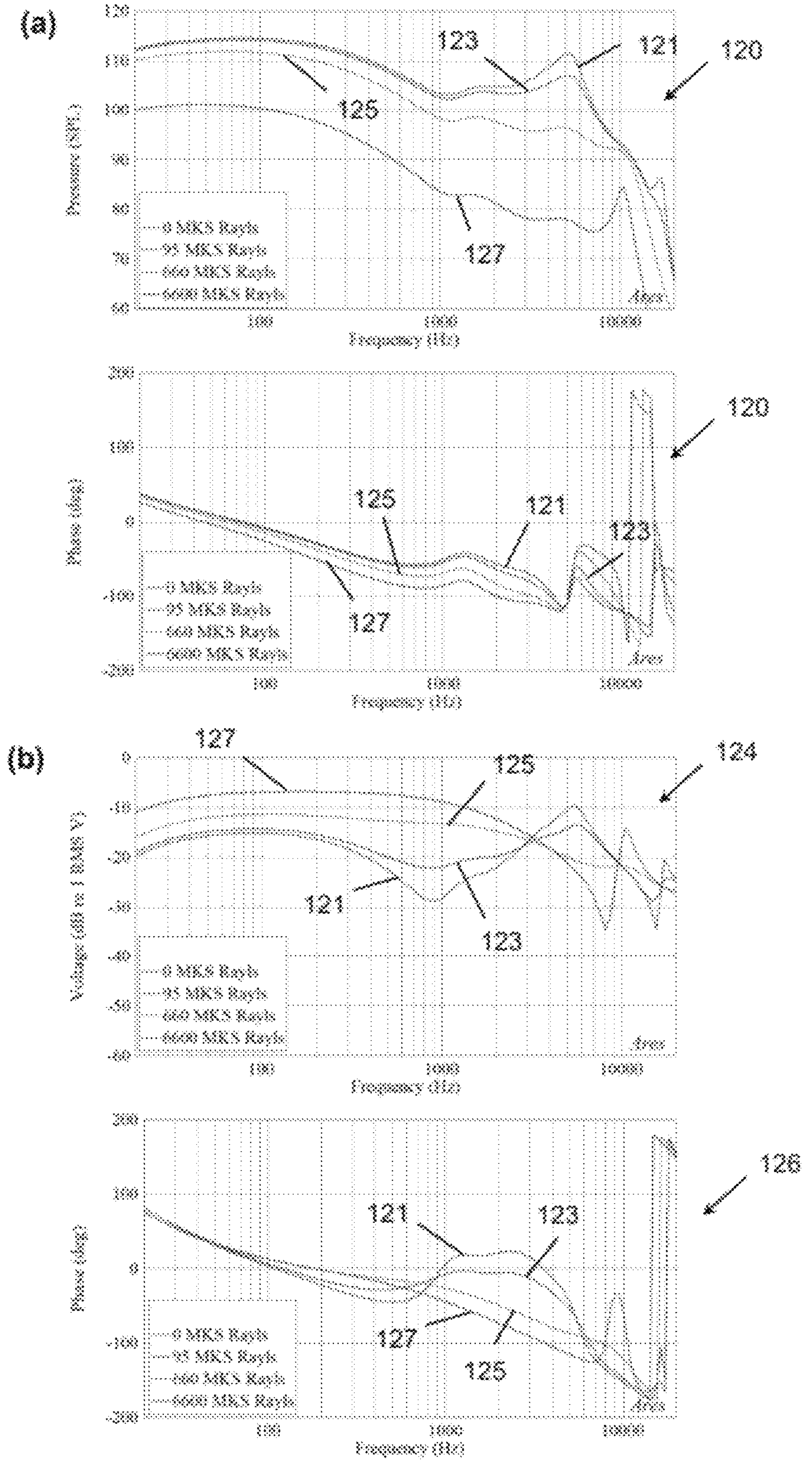
FIG. 3 shows results of ARES acoustic modelling of an eardrum response and speaker port microphone response of an audio reproducing device.

FIG. 3 shows results produced by ARES based on an acoustic model of the earbud in response to a selected arbitrary speaker sound stimulus. The plots in FIG. 3(*a*) show the modelled sound pressure magnitude 120 and phase responses 122 at the eardrum of the user for varying levels of blockage in the acoustic path, and the plots in FIG. 3(*b*) show the modelled magnitude 124 and phase 126 responses at the speaker port microphone (SPM) for varying levels of blockage in the acoustic path.

In the present acoustic model, the varying simulated levels of blockage are as follows:

| Simulated Blockage Level | Corresponding acoustic impedance | Plot |
|---|---|---|
| Missing speaker port filter (mesh) | 0 MKS Rayls | 121 |
| Normal speaker | 95 MKS Rayls | 123 |
| Moderate wax on port filter (mesh) | 660 MKS Rayls | 125 |
| Severe wax on port filter (mesh) | 6600 MKS Rayls | 127 |

It can be seen from the ARES modelling results that wax blockages in the acoustic path between the earbud speaker and the user's eardrum, and the absence of a filter on the speaker port, have a significant observable effect on sound magnitude response at the eardrum, and sound received at the speaker port microphone (SPM).

The SPM response shows readily observable changes in the SPM magnitude response and phase response above ~1 kHz. In particular, a missing sound port mesh (corresponding to the 0 MKS Rayls model results) is expected to cause a significant rise in high frequency response (around ~5 kHz).

The SPM results 124, 126 show that as wax blockage increases, a magnitude rise is expected to occur below ~3 kHz and above ~9.5 kHz, but a magnitude loss is expected to occur between these frequencies. In addition, a missing mesh is expected to cause a reduction in magnitude response below 3 kHz and above ~15 kHz, but a rise in magnitude response between these frequencies. The severe wax blockage simulation (6600 MKS Rayls) is expected to cause a significant shift in resonance behaviour, which is observable in the SPM high frequency response (~8-9 kHz).

Wax Blockage Tests

Tests were carried out on sample earbuds provided with a varying degree of simulated earwax blockage conditions, and for each sample blockage level the eardrum response, speaker port microphone (SPM) response and acoustic condition data indicative of a change in sound transfer function $H_{yu}$ compared to a reference (normal) transfer function $H_{yu}$(ref) were determined.

In this example, the varying earwax blockage levels were simulated using beeswax, and the tests were carried out using a Head-And-Torso-Simulator (HATS) device.

Test were also carried out for varying blockage levels and varying eartip fit conditions.

The following table shows the specifications of the wax blockage tests carried out.

| Test Set | Earbud Type | HATS Pinna Type | In-Ear Fit | Stimulus Type | Wax Blockage Levels |
|---|---|---|---|---|---|
| 0.0 | A | ITU-T P.57 Type 3.3 | Good Fit | 1 | 0 -> 100% (5 spread levels on port mesh) |
| 1.0 | B | ITU-T P.57 Type 3.3 | Good Fit | 1 | 0 -> 100% (7 spread levels on port mesh) |
| 1.1 | B | ITU-T P.57 Type 3.3 | Good Fit | 1 | 0 -> 100% (8 ring levels on port mesh) |
| 1.2 | B | ITU-T P.57 Type 3.3 | Good Fit | 1 | 0 -> 100% (8 levels on tip wax guard) |
| 2.0 | C | Anthropometric/ Approx. Type 3.3 | Varying (Good -> Poor) | 2 | 0 -> 100% (5 spread levels on port mesh) |

The earbud types A, B and C were the same earbud device with different internal software and settings. Speaker stimulus types 1 and 2 used similar test sound samples but with different presentation levels to provide high enough output level in the earbud speaker port to be representative of typical product usage levels, and to provide sufficient SNR above any environmental noise that may exist in the test environment.

Figure 4:
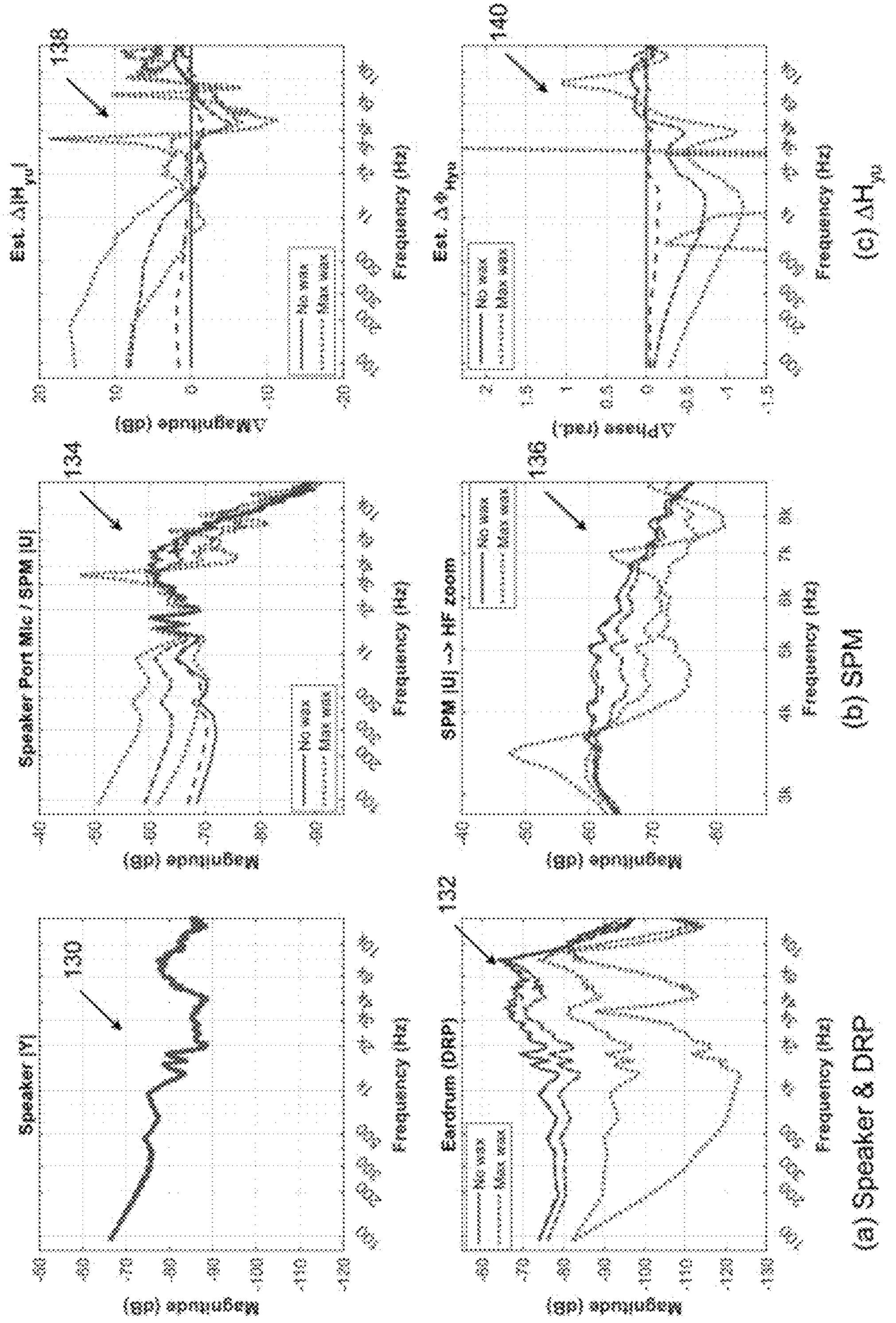
FIGS. 4 to 9 show the results of tests carried out on an audio reproducing device to determine transfer function response for various fit and wax conditions.

FIG. 4 shows the results for a first test (set 0.0) with five increasing levels of wax spread on the speaker port mesh from no wax to significant (100%) wax.

FIG. 4*a* shows the magnitude response 130 for the sound port speaker used in the first test and the magnitude response 132 for audio received at the simulated eardrum in the test.

FIG. 4*b* shows the magnitude response 134 at the sound port microphone used in the first test across a frequency range 0 Hz to about 12 kHz, and a focused view 136 of the magnitude response for frequencies between about 3 kHz and 9 kHz. FIG. 4*c* shows the measured changes in the magnitude component 138 of the sound transfer function $H_{yu}$ compared to the magnitude of the sound transfer function $H_{yu}$ with no wax present, and the measured changes in the phase component 140 of the sound transfer function $H_{yu}$ compared to the phase component of the sound transfer function $H_{yu}$ with no wax present.

Figure 5:
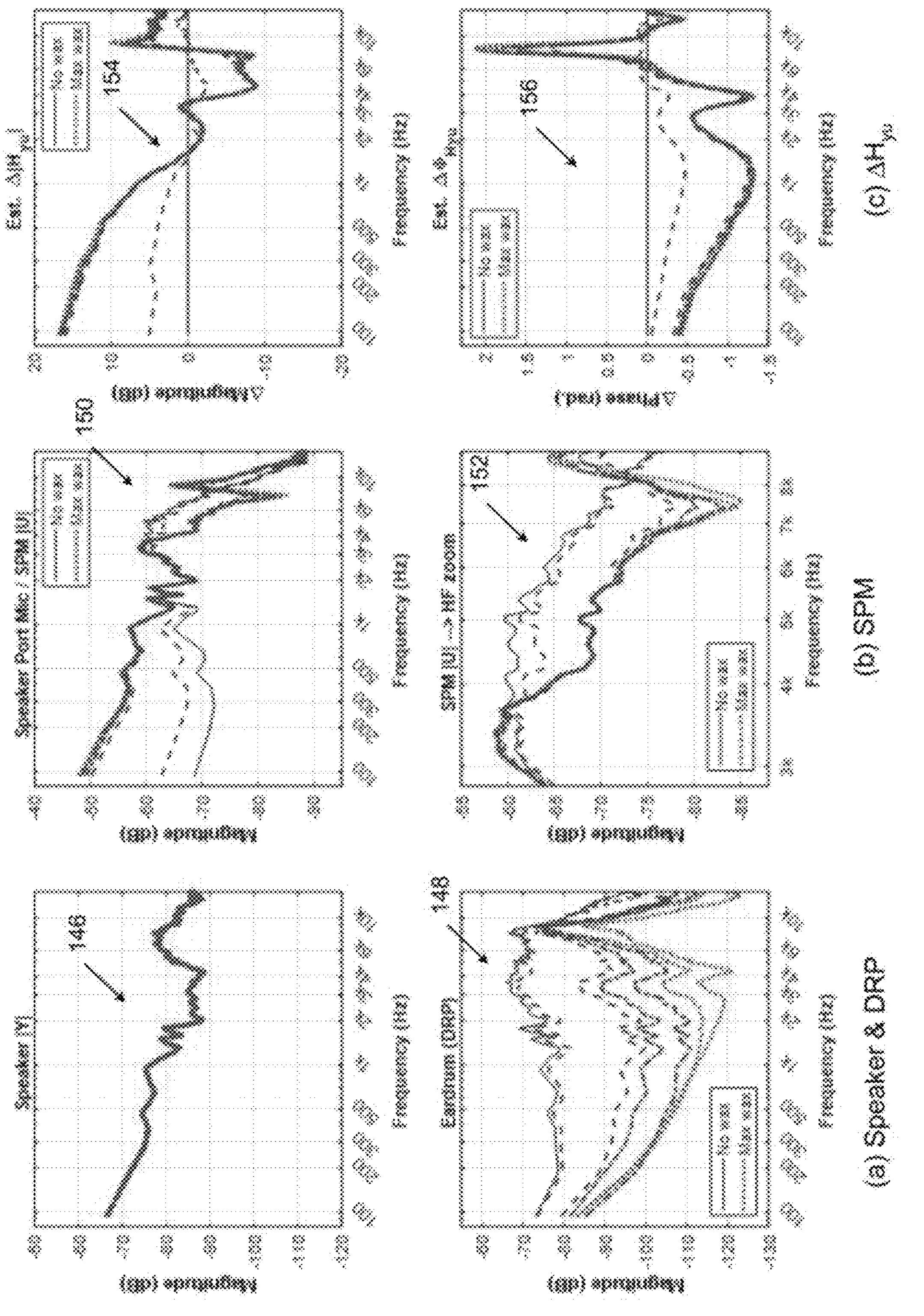

FIG. 5 shows the results for a second test (set 1.0) with seven increasing levels of wax spread on the speaker port mesh from no wax to significant (100%) wax.

FIG. 5*a* shows the magnitude response 146 for the sound port speaker used in the second test and the magnitude response 148 for audio received at the simulated eardrum in the test.

FIG. 5*b* shows the magnitude response 150 at the sound port microphone used in the second test across a frequency range 0 Hz to about 12 kHz, and a focused view 152 of the magnitude response for frequencies between about 3 kHz and 9 kHz. FIG. 5*c* shows the measured changes in the magnitude component 154 of the sound transfer function $H_{yu}$ compared to the magnitude of the sound transfer function $H_{yu}$ with no wax present, and the measured changes 158 in the phase component of the sound transfer function $H_{yu}$ compared to the phase component of the sound transfer function $H_{yu}$ with no wax present.

Figure 6:
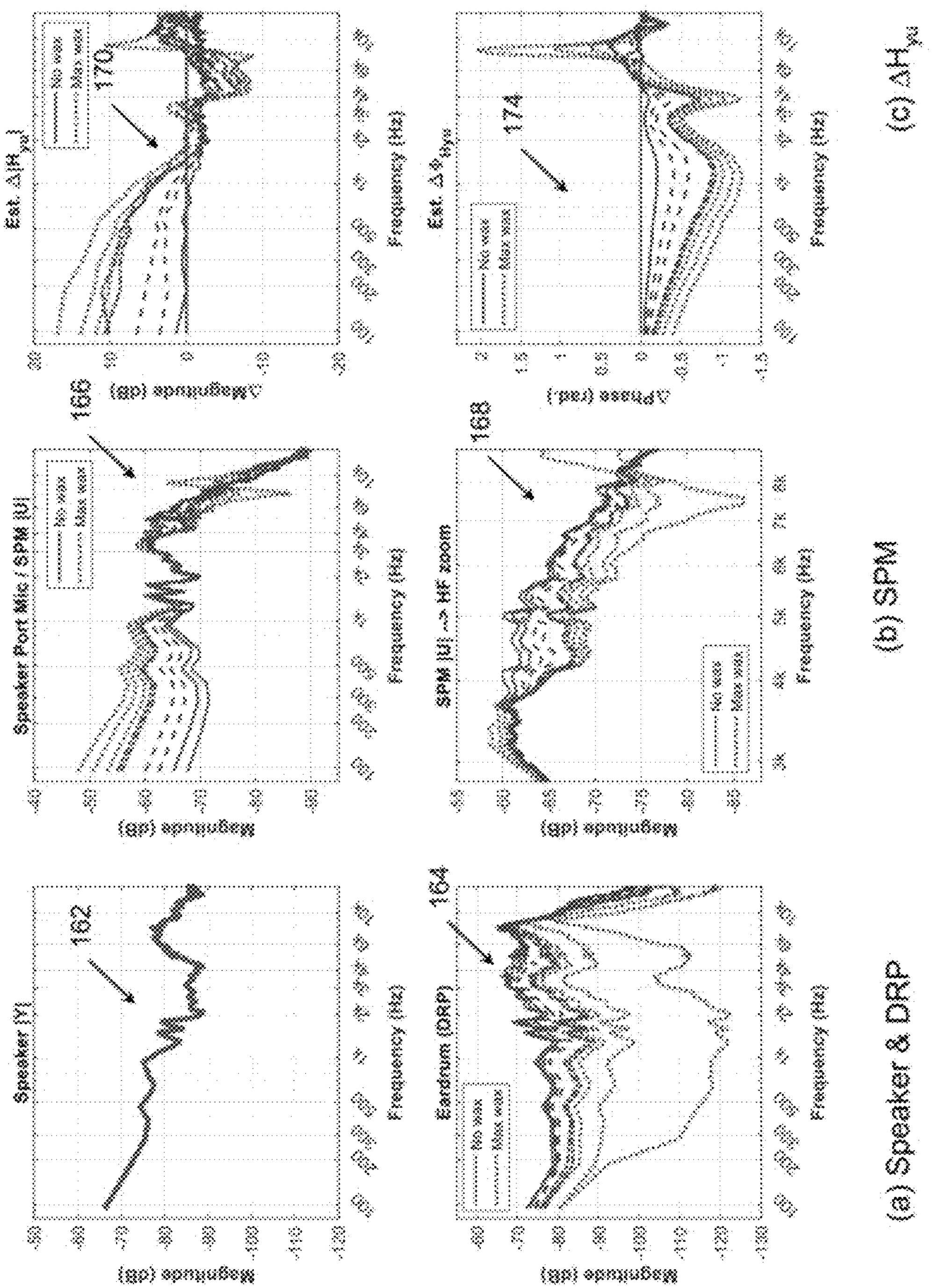

FIG. 6 shows the results for a third test (set 1.1) with eight increasing levels of wax spread on speaker port mesh from no wax to significant (100%) wax, the wax accumulated from an outer ring towards the centre of the mesh.

FIG. 6*a* shows the magnitude response 162 for the sound port speaker used in the third test and the magnitude response 164 for audio received at the simulated eardrum in the test.

FIG. 6*b* shows the magnitude response 166 at the sound port microphone used in the third test across a frequency range 0 Hz to about 12 kHz, and a focused view 168 of the magnitude response for frequencies between about 3 kHz and 9 kHz. FIG. 6*c* shows the measured changes in the magnitude component 240 of the sound transfer function $H_{yu}$ compared to the magnitude of the sound transfer function $H_{yu}$ with no wax present, and the measured changes 244 in the phase component of the sound transfer function $H_{yu}$ compared to the phase component of the sound transfer function $H_{yu}$ with no wax present.

Figure 7:
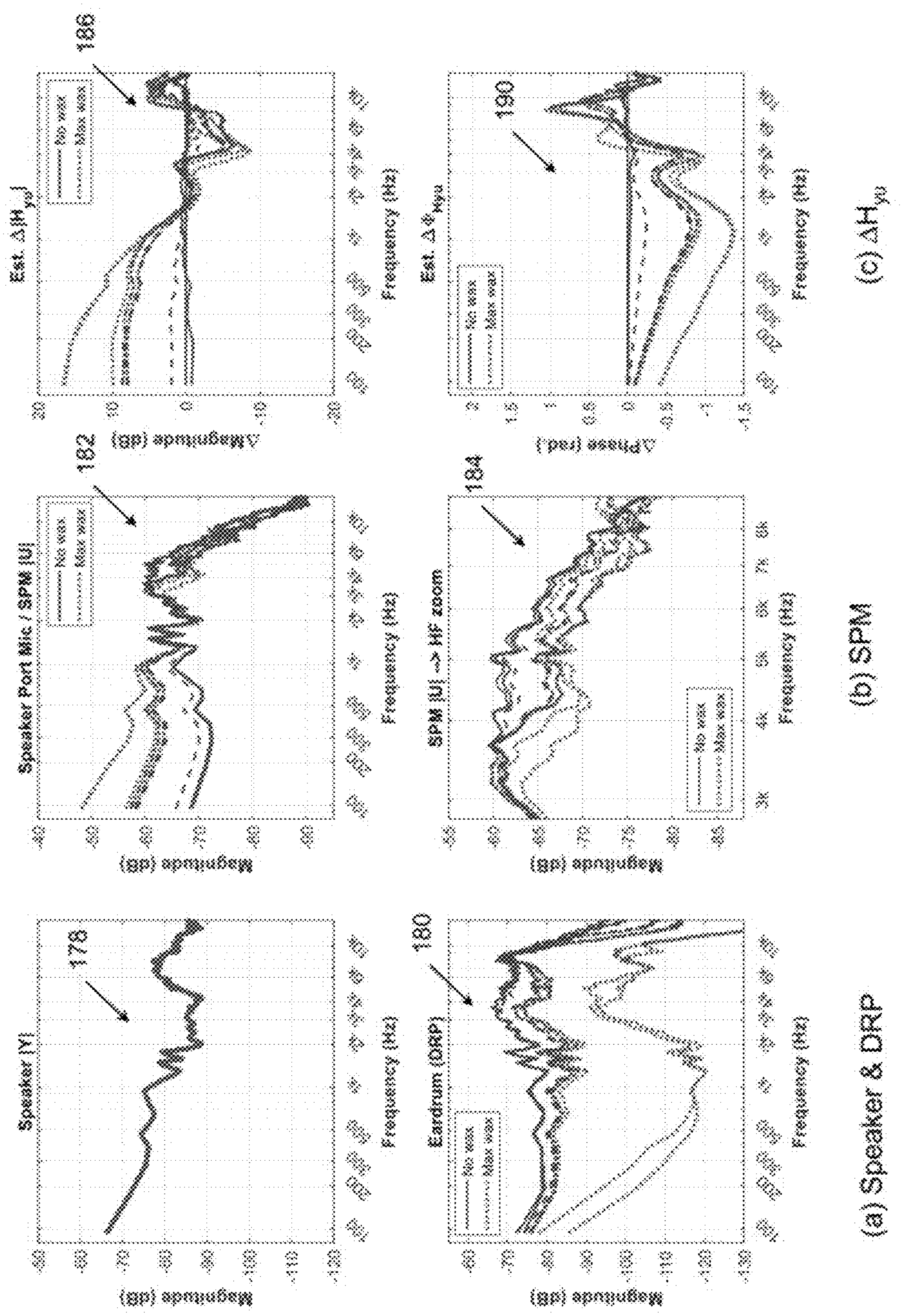

FIG. 7 shows the results for a fourth test (set 1.2) with eight increasing levels of wax spread on the wax guard of an ear-tip, rather than on the speaker port mesh, from no wax to significant (100%) wax. In this test, no wax was present on the speaker port mesh.

FIG. 7*a* shows the magnitude response 248 for the sound port speaker used in the fourth test and the magnitude response 180 for audio received at the simulated eardrum in the test.

FIG. 7*b* shows the magnitude response 182 at the sound port microphone used in the fourth test across a frequency range 0 Hz to about 12 kHz, and a focused view 184 of the magnitude response for frequencies between about 3 kHz and 9 kHz. FIG. 7*c* shows the measured changes 186 in the magnitude component of the sound transfer function $H_{yu}$ compared to the magnitude of the sound transfer function $H_{yu}$ with no wax present, and the measured changes 190 in the phase component of the sound transfer function $H_{yu}$ compared to the phase component of the sound transfer function $H_{yu}$ with no wax present.

Figure 8A:
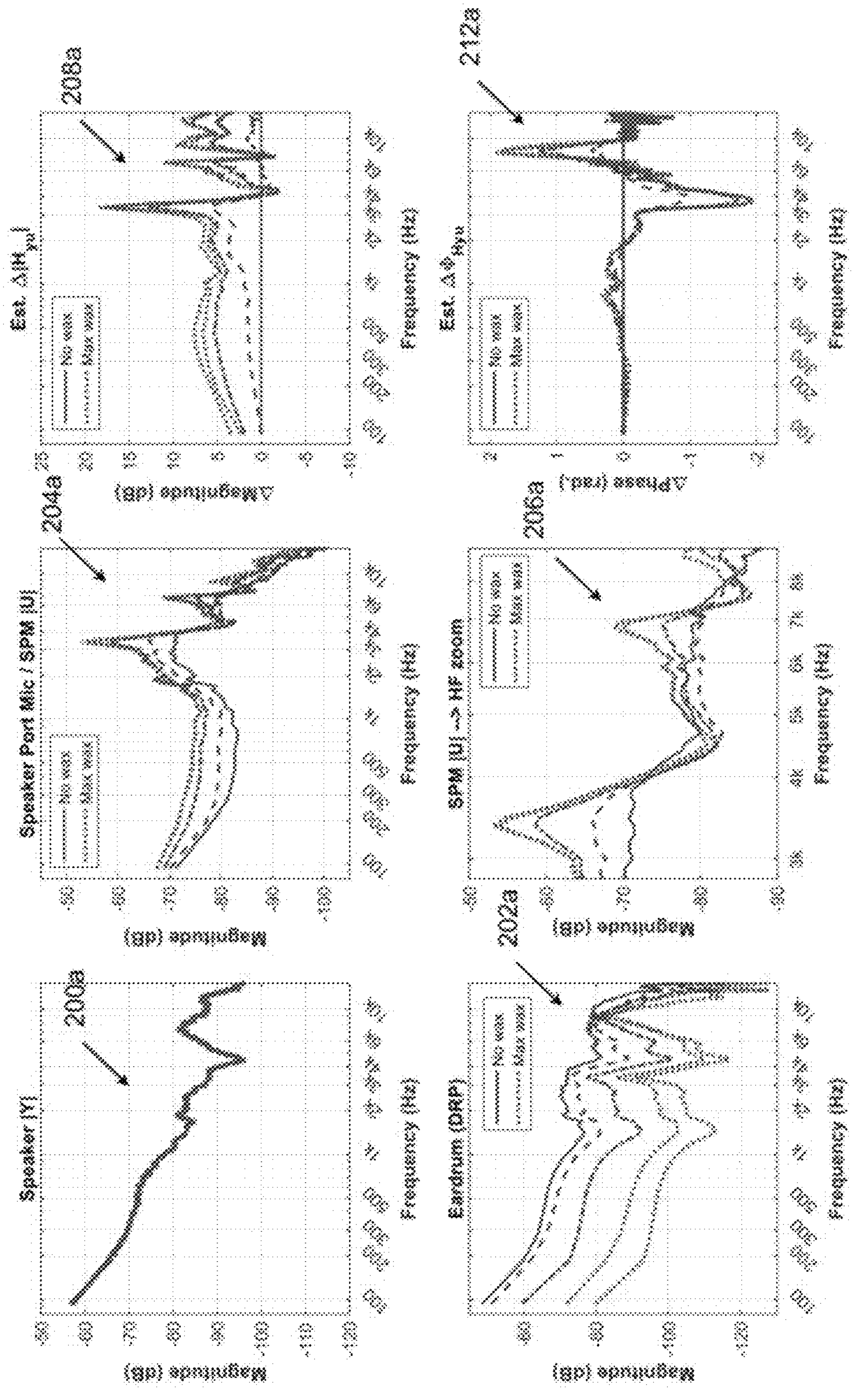
Figure 8B:
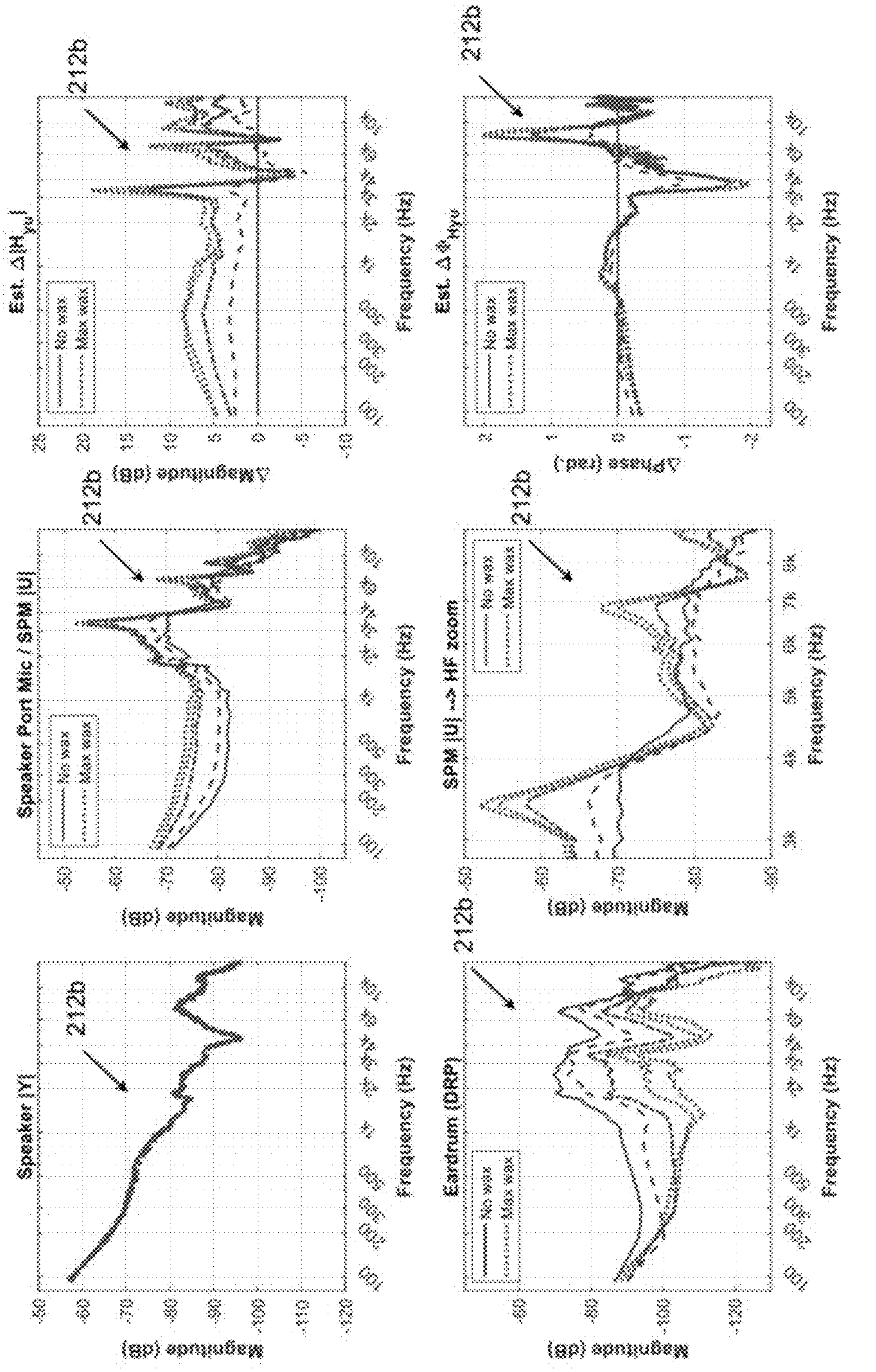
Figure 9:
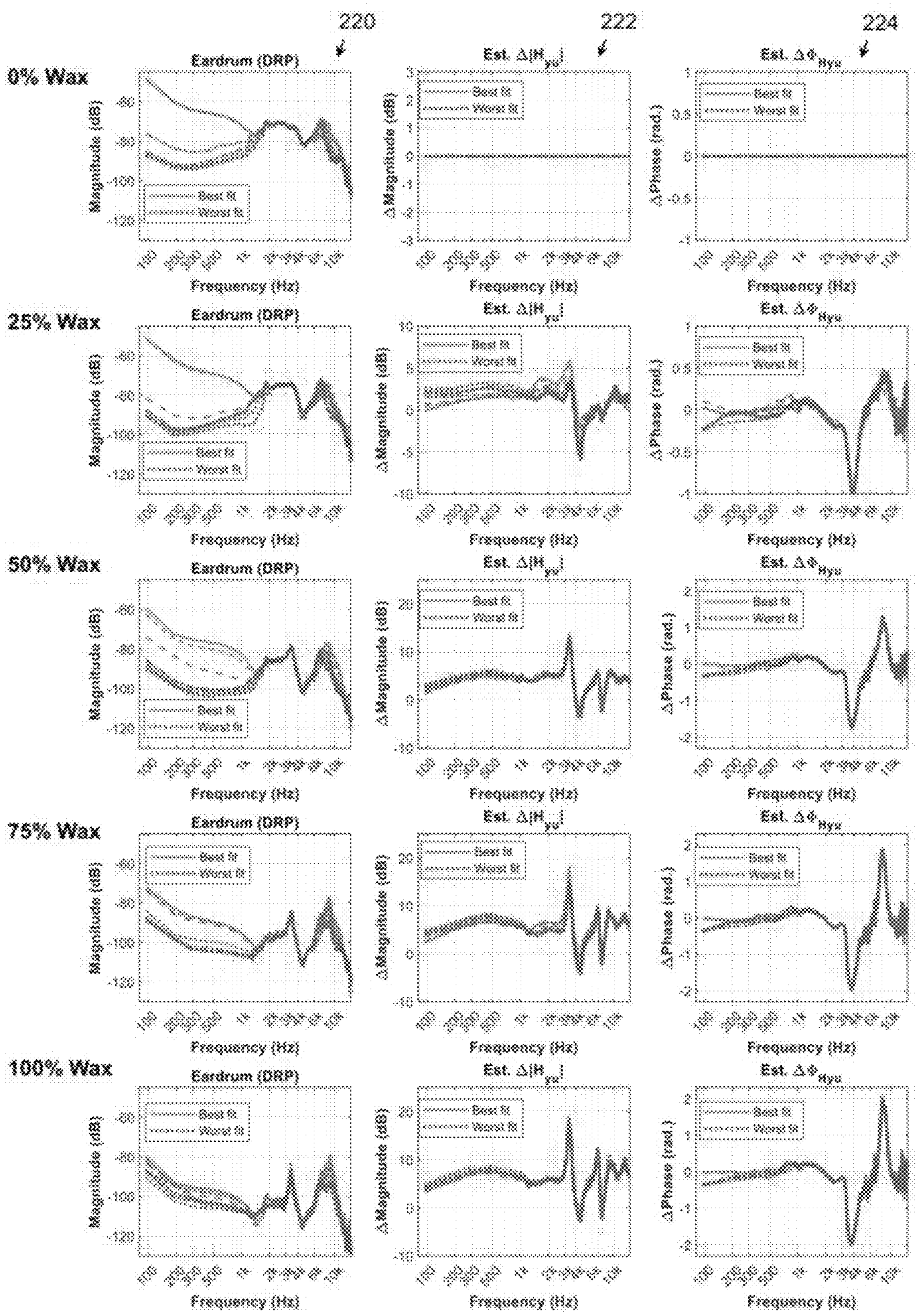

FIGS. 8*a*, 8*b* and 9 show the results for a fifth test (set 2.0) with varying degrees of both wax blockage and in-ear fit, as follows:

(i) five increasing levels of wax spread on the speaker port mesh, from no wax to significant (100%) wax for a good fit (FIG. 8*a*) and poor fit (FIG. 8*b*);

(ii) eight degrees of in-ear fit varied from good (acoustically well sealed and coupled to ear canal) to very poor (high acoustic leakage and poor coupling to ear canal).

For the fifth test, a different earbud, HATS pinna (anthropometric) and stimulus were used compared to the first to fourth tests.

FIGS. 8*a* and 8*b* show the magnitude response 200*a*, 200*b* for the sound port speaker used in the fifth test, the magnitude response 202*a*, 202*b* for audio received at the simulated eardrum in the test, the magnitude response 204*a*, 204*b* at the sound port microphone used in the fifth test across a frequency range 0 Hz to about 12 kHz, a focused view 206*a*, 206*b* of the magnitude response for frequencies between about 3 kHz and 9 kHz, the measured changes 208*a*, 208*b* in the magnitude component of the sound transfer function $H_{yu}$ compared to the magnitude of the sound transfer function $H_{yu}$ with no wax present, and the measured changes 212*a*, 212*b* in the phase component of the sound transfer function $H_{yu}$ compared to the phase component of the sound transfer function $H_{yu}$ with no wax present, for a good ear fit (FIG. 8*a*) and a poor ear fit (FIG. 8*b*).

FIG. 9 shows test results for 5 different levels of wax blockage—0%, 25%, 50%, 75% and 100%—as the fit is varied across 8 levels from good to poor.

The results in FIG. 9 for each level of wax blockage include a magnitude response 220 for audio received at the simulated eardrum in the test, the measured changes 222 in the magnitude component of the sound transfer function $H_{yu}$ compared to the magnitude of the sound transfer function $H_{yu}$ with no wax present, and the measured changes 224 in the phase component of the sound transfer function $H_{yu}$ compared to the phase component of the sound transfer function $H_{yu}$ with no wax present, for varying quality of ear fit.

The test results illustrated in FIGS. 4-9 indicate that the earbud drum (DRP) level is highly sensitive to the presence of wax on the speaker port mesh or tip wax guard, and that the estimated sound $H_{yu}$ transfer function magnitude and phase responses change as the level of wax changes. Most of these changes in the sound transfer function ($\Delta H_{yu}$) are relatively robust and easily observable across a range of wax and usage conditions, although the form of the changes can be highly dependent on physical properties of the audio system 10.

It will be appreciated that the sound transfer function changes $\Delta H_{yu}$ predominantly occur in several frequency band ranges, as illustrated in the table below:

| | Magnitude ($\Delta\lvert H_{yu}\rvert$) | Phase ($\Delta\varphi H_{yu}$) |
|---|---|---|
| Approximate upper frequency band range | 3-8 KHz | 6-10 KHz |

-continued

| | Magnitude ($\Delta \lvert H_{yu} \rvert$) | Phase ($\Delta\varphi H_{yu}$) |
|---|---|---|
| Approximate lower frequency band range | <2 kHz | <5 kHz |

It will also be appreciated that the above indicated bandwidth ranges are likely dependent on the specific acoustic properties of the particular audio reproducing device used in the tests. In particular, the upper bandwidth ranges exhibit complex resonant features that are highly dependent on particular physical properties and positioning within the ear canal.

While the identified lower frequency band range has associated detectable changes in the sound transfer function $\Delta H_{yu}$, a range of potential issues with the usability of the lower frequency $\Delta H_{yu}$ band range (below 2 kHz) to detect changes caused by presence of foreign matter may exist, for the following reasons:

- The low frequency $M_{yu}$ response can be at least partially dependent on the in-ear physical fit of the earbud in a user's ear canal, and the associated "occlusion effect", as exhibited in the changes in $\Delta H_{yu}$ response at low frequency and low wax blockages (such as 25% blockage) in FIG. 9.
- The low frequency speaker port microphone (SPM) response may be dependent on the effect of Active Noise Cancellation (ANC) technology if activated.
- The low frequency SPM response may be affected by low frequency environmental noise and the users own-voice.

Figure 10:
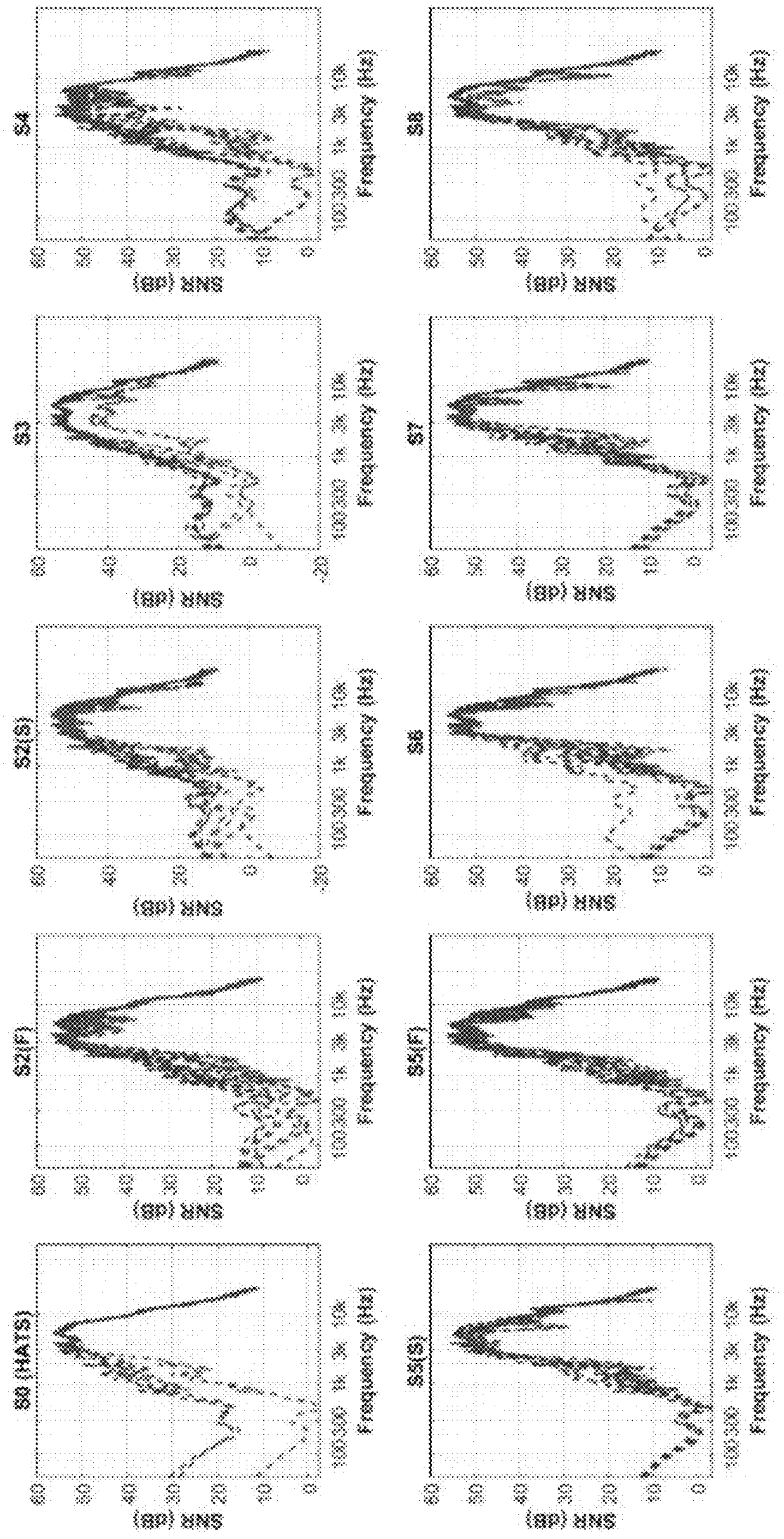
FIG. 10 shows results of signal-to-noise-ratio (SNR) tests for various scenarios and ear fits.

The potential effect of environmental noise on SPM response is illustrated by the plots of signal-to-noise ratio (SNR) in FIG. 10. The plots in FIG. 10 show SPM SNR for eight test subjects (in some cases using two different ear-tip types—(first—F) and (second—S)), each plot for a moderate level speaker output in simulated 65 dB(A) airport noise for varying earbud in-ear fits. The plots show that earbud SPM SNR is robust and relatively independent of fit above 2 kHz, but can rapidly drop close to 0 dB below 2 kHz for poor fits.

During use, background low frequency sound may pass from an external environment into the acoustic path 20. In such a situation, the background low frequency sound may interfere with calculation of the acoustic condition data if the background low frequency sound is not taken into account. In an embodiment, the audio system self-test process is primarily carried out using frequencies <500 Hz. However, the use of low frequency may not always be possible, for example because of poor signal-to-noise ratio, and in this circumstance the acoustic condition data is calculated using frequencies of 300 Hz to 3 kHz.

In an embodiment, the abnormal condition includes presence of foreign matter in the acoustic path 20. For example, wax and oil from a user's ear may ingress into the acoustic path 20. The presence of foreign matter in the acoustic path 20 can alter acoustic properties of the earbud to the extent that sound quality of the earbud is compromised. A user may not always be able to detect comprised sound quality, for example if the build-up of foreign matter occurs progressively or if the user has hearing issues. In addition, it is not always possible to see the oil and wax which makes visual diagnosis difficult.

The present audio system is able to self-diagnose abnormal conditions, including presence of foreign matter in the acoustic path 20, by producing acoustic condition data using the speaker signal and the speaker port microphone signal.

In an embodiment, the acoustic condition data is determined based on a change in a sound magnitude and/or phase transfer function compared to a normal condition sound magnitude and/or phase transfer function. Predefined conditions may be used to determine whether a change in magnitude, change in phase, or both change in magnitude and phase transfer function are used to produce the acoustic condition data and therefore make determinations as to whether an abnormal condition exists.

For example, the presence of wax or oil in the acoustic path 20 may be determined by determining a change in the magnitude transfer function of the acoustic microphone input signal at a frequency <3 kHz and/or >9.5 kHz compared to an expected transfer function (in the absence of the foreign matter). However, the amount and type of foreign matter can affect low and high frequencies differently. Therefore, in some circumstances, a better comparison is made by using relatively low transfer function frequencies, while in others a better comparison is made by using relatively high transfer function frequencies. In an embodiment, both relatively low and relatively high transfer function frequencies are used to determine foreign matter in the acoustic path 20. In another example, the presence of foreign matter is determined by comparing the transfer function at frequencies ranging from 3 kHz to 9.5 kHz to the expected transfer function (in the absence of the foreign matter) at the same frequencies.

In a further embodiment, the abnormal condition is absence of the filter 24. The predefined conditions used to determine the absence of the filter 24 are different to the predefined conditions to determine the presence of wax and/or oil. For example, the absence of the filter 24 may be determined by identifying a decrease in the transfer function magnitude at relatively low frequencies <3 kHz compared to the expected transfer function magnitude when the filter 24 is located in the acoustic path. In another example, filter absence is determined by identifying an increase in the transfer function magnitude at frequencies at and adjacent 5 kHz compared to the expected transfer function magnitude when the filter 24 is located in the acoustic path.

In addition to the presence of foreign matter in the acoustic path 20 and the absence of the filter 24, the abnormal condition can also include a poor fit between an ear tip 18 and an ear canal of a user. A poor fit of the earbud in an ear canal of a user can result in leakage of sound out of the acoustic path, interference due to background noise entering the acoustic path 20 from the external environment, user discomfort, and a decreased user audio experience.

In an example, the fit of the ear bud in the ear canal can be determined by reference to predefined conditions. Since a poor fit of the earbud in the ear canal 30 can introduce background noise into the acoustic path 20, determining a signal-to-noise ratio of the speaker port microphone signal can be used to select the predefined conditions that will be used to determine the acoustic condition data. While lower frequencies tend to be better suited to determining fit of the earbud in the ear canal, lower frequencies can be subject to greater interference in noisy environments. The audio system 10 is therefore arranged to use the determined signal-to-noise ratio to select the frequency range(s) that will be used to determine the quality of fit.

For example, if the speaker port microphone signal has a signal-to-noise ratio below a defined signal-to-noise threshold, a frequency ranging from 300 Hz to 3 kHz may be selected as the frequency range used to determine the acoustic condition data. But, if the signal-to-noise ratio is above the threshold, the transfer function changes at frequencies <500 Hz may be used.

When more than one frequency range is usable to determine an abnormal condition, the analysis unit 26 may apply a weighting methodology to select the particular frequency range(s) to be used.

Figure 11:
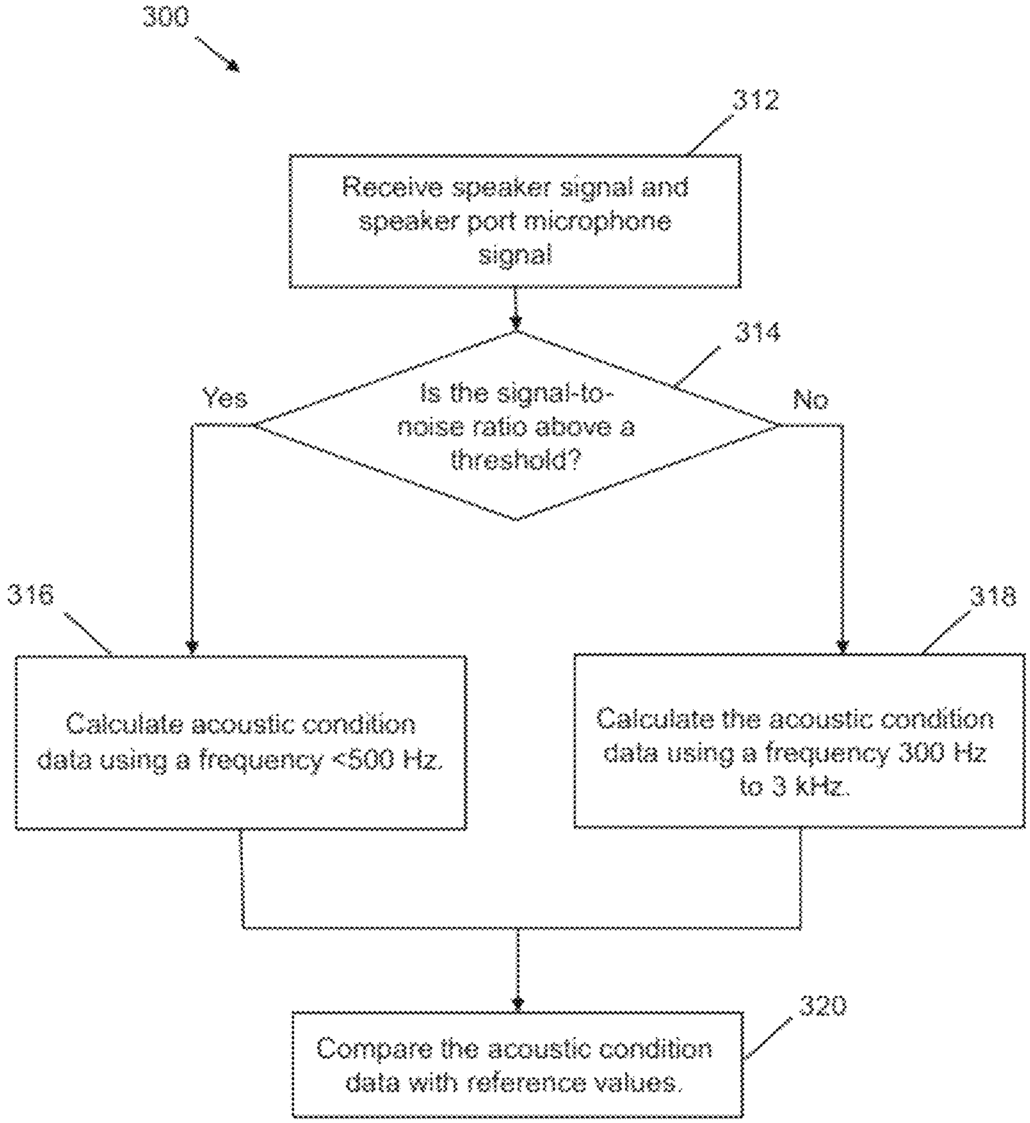
FIG. 11 shows a process flow implemented by the audio system shown in FIG. 1.

Determination of the fit of the earbud in a user's ear canal 30 using a determined signal-to-noise ratio is described with reference to process flow diagram 300 in FIG. 11. At step 312, the speaker signal and the speaker port microphone signal are received by the analysis unit 26. If an external microphone 28 is used, the acoustic background input signal produced by the external microphone 28 may also be received by the analysis unit 26 in step 212. At step 214, the analysis unit 26 then calculates whether the signal-to-noise ratio is above a threshold value. If the signal-to-noise ratio is above the threshold value, the acoustic condition data is calculated using a frequency <500 Hz at step 216. If the signal-to-noise ratio is below the threshold value, the acoustic condition data is calculated using a frequency 300 Hz to 3 kHz at step 218. After step 216 or 218, the acoustic condition data is compared with reference values at step 220.

Figure 12:
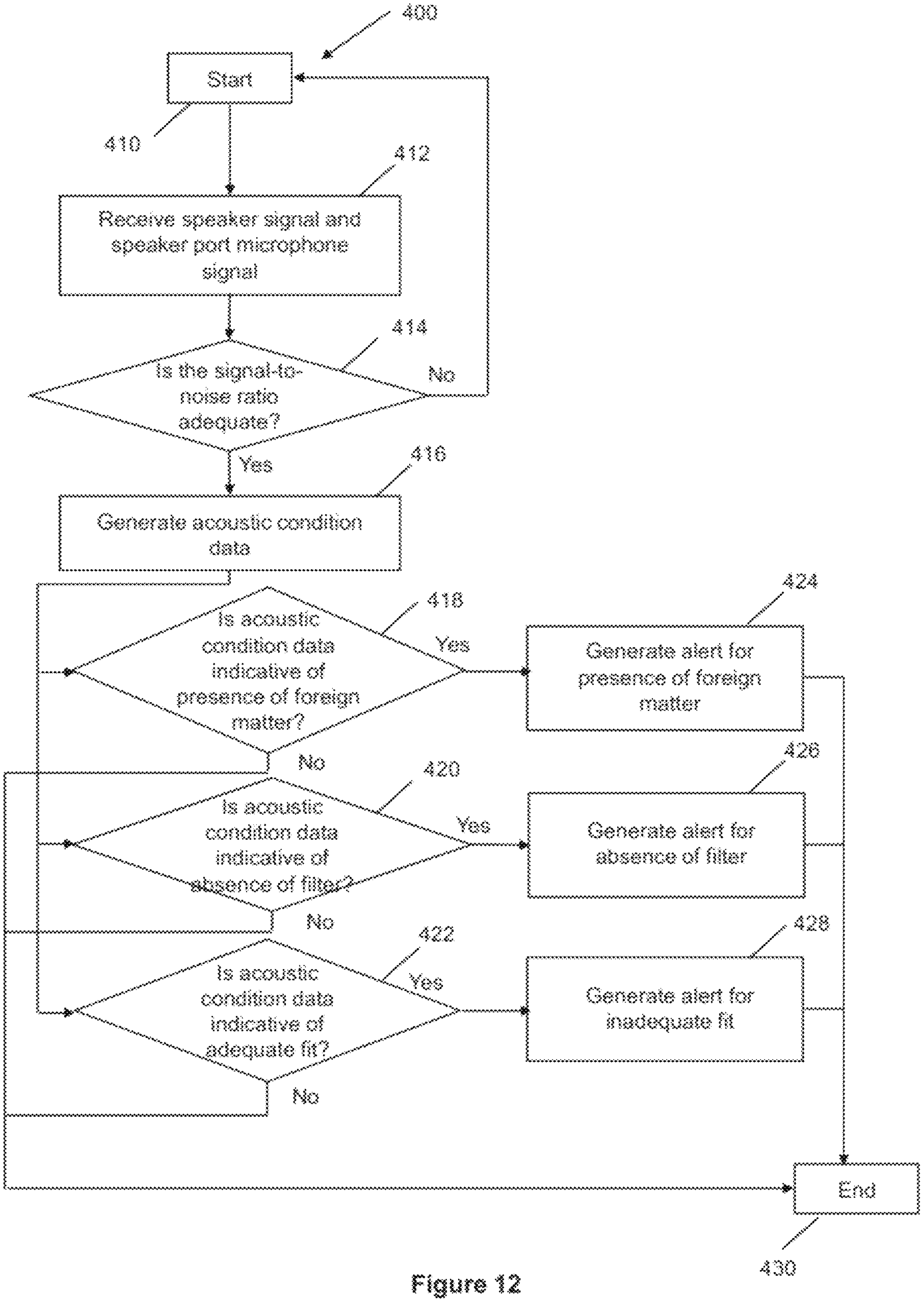
FIG. 12 shows a further process flow implemented by the audio system shown in FIG. 1.

The presence of foreign matter in the acoustic path 20, absence of the filter 24, and correct fit can be determined in a single process flow, as shown in process flow diagram 400 shown in FIG. 12. The process flow 400 starts at step 410, which may be performed by user interaction with a management system. Alternatively, the process 400 may activate automatically independently of a user, such as at regular intervals determined by the management system. The management system may be in communication with a remote data storage device, which may store data associated with the process flow 400. After commencement of the process 400, the speaker signal and speaker port microphone signal are received by the analysis unit at step 412. As indicated at step 314, a signal-to-noise ratio at the speaker port microphone is then calculated, and if the signal-to-noise ratio is above a base threshold, the process flow 400 continues to step 416. If the signal-to-noise ratio is not adequate and is below the base threshold, the process flow 400 goes back to the start at step 410. In response to the detected low signal-to-noise ratio, the management system 34 may change the parameters used to perform process flow 400. For example, the management system 34 may prompt a user to increase volume of the earbud to improve the signal-to-noise ratio or an alternate frequency range may be used to determine the acoustic condition data. After determination of a satisfactory signal-to-noise ratio, acoustic condition data is generated, as indicated at step 416.

Following step 416, steps 418, 420 and 422 are performed and relate to determining whether an abnormal condition is considered to exist based on the determined acoustic condition data.

Step 418 determines whether the acoustic condition data is indicative of presence of foreign matter in the acoustic path 20 and, if so, a corresponding alert signal may be generated, and for example sent at step 424 to the management system.

Step 420 determines whether the acoustic condition data is indicative of the absence of the filter 24 and, if so, a corresponding alert signal may be generated, and for example sent at step 426 to the management system.

Step 422 determines whether the acoustic condition data is indicative of an inadequate fit and, if so, a corresponding alert signal is generated, and for example sent at step 428 to the management system.

Steps 418, 420 and 422 are shown as being performed simultaneously in FIG. 4.

However, steps 318, 320 and 322 could be performed sequentially. For example, process flow 400 could proceed in the following orders:

step 416→step 418→step 420→step 422;
step 416→step 418→step 422→step 420;
step 416→step 420→step 418→step 422;
step 416→step 420→step 422→step 418;
step 416→step 422→step 418→step 420;
step 416→step 422→step 420→step 418;
step 416→simultaneously step 418 and step 420→step 422;
step 416→simultaneously step 418 and step 422→step 420; and
step 416→simultaneously step 420 and step 422→step 418.

The order of steps 418, 420 and 422 may dependent on reducing computational complexity.

In an embodiment, the analysis unit 26 includes an audio file that corresponds to a reference audio signal for use by the speaker 15 to produce a reference sound. The analysis unit 26 may also store, for example temporarily in response to receipt from the management system, the expected magnitude and phase transfer functions associated with the audio file for normal operation.

Fit Analysis

As discussed above, while it is possible to detect variations in fit using changes to the $H_{yu}$ transfer function at low frequencies, achieving good results using this metric is dependent on a sufficiently high signal-to-noise ratio. Accordingly, in a variation, further fit tests may be carried out using relatively high frequencies in order that an indication as to quality of fit can still be provided if the low frequency signal-to-noise ratio is too low.

The fit of an audio reproducing device, in this example an earbud, is often critical for satisfactory audio performance, in particular in relation to the following performance aspects:

i) User perceived low frequency (bass) loudness, which is important for media streaming and because it is often used as a key product performance benchmark.
ii) External sound attenuation, which is important for overall sound quality, performance of active noise cancellation (ANC) as well as hearing protection and control.
iii) Maximum achievable gain and feedback susceptibility, which is improved by minimising low high frequency leakage.

As an alternative to carrying out analysis of fit quality using changes to the transfer function $H_{yu}$ only, in addition or alternatively one or more different tests may be used.

With the present fit test methodology, instead of using sound that is generated during normal use, an “offline probe test' (OPT) may be carried out wherein a defined short sound clip (for example, 5-10 seconds) referred to as a “probe” is generated at the speaker 15, and responses analysed using signals from the speaker port microphone 22, and/or from one or more of the external microphones 28.

The fit analysis process may be implemented in any suitable way, for example using software installed on a computing device, in particular a smart phone, that is in wireless communication with the earbuds. For tests that use a 'probe', sound data indicative of the probe may be stored on the computing device and communicated to the earbud for reproduction by the earbud speaker 15, although it will be understood that other variations are possible.

The present fit analysis methodology produces fit rating results in percentage form, as follows:

Overall fit (0-100%)

Low Frequency (LF) fit (seal) (0-100%)

High Frequency (HF) fit (isolation and leakage) (0-100%)

The LF fit measure is indicative of how well low frequency sound is retained in the audio pathway during use of the audio reproducing device, in this example an earbud. The HF fit measure is indicative of how much high frequency sound is leaking either into or out of the audio pathway.

Providing LF & HF fit measures can be advantageous for the following reasons:

1. To allow characterisation of fit according to the multiple aspects described above—in-ear low frequency (bass) loudness, external sound attenuation and performance of active noise cancellation (ANC), and maximum achievable gain and feedback susceptibility.
2. To discriminate different fits better for some users, particularly for users that are not be able to achieve a good low frequency seal and exhibit significant high frequency fit variation.

Figure 21:
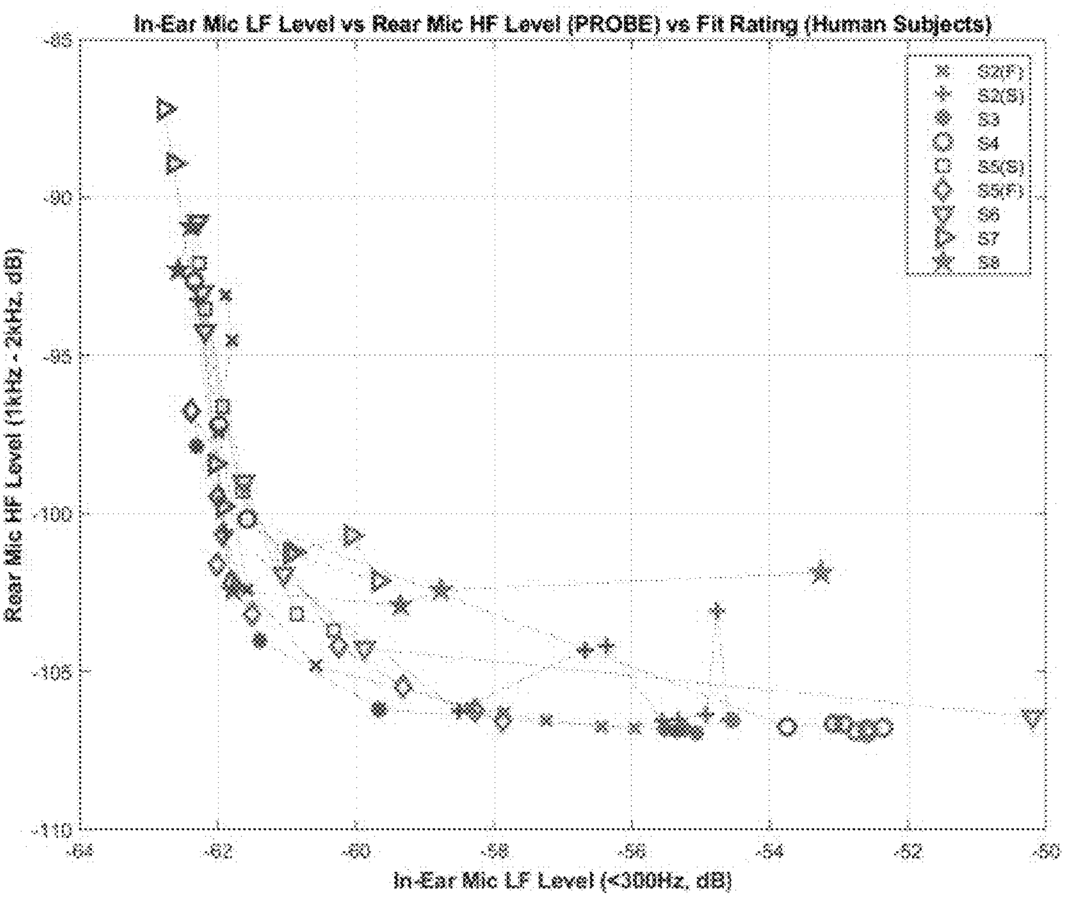
FIG. 21 shows plots of high frequency external microphone response vs low frequency internal microphone response for several subjects and several fits.

FIG. 21 illustrates a relationship between speaker microphone response at relatively low frequencies (In-Ear Mic LF Level) and external microphone response at relatively high frequencies (Rear Mic HF Level) based on a probe sound generated at the earbud speaker for several subjects and several different levels of fit quality for each subject. The subjects are identified as S2-S8, and some subjects (S2 and S5) performed the test twice using different ear tips.

The relationship in FIG. 21 indicates that as the fit deteriorates, the low frequency response at the speaker port microphone deteriorates, and eventually the high frequency response at the external microphone becomes much more significant.

As described above, the fit analysis would typically include the following test:

1. Speaker port microphone response at frequencies <500 Hz to a sound probe generated at the earbud speaker.

In addition, or alternatively, the fit analysis may include the following tests:

2. Response at the speaker port microphone compared to the response at an external microphone at frequencies 300 Hz-3 kHz without a sound probe and therefore based on environmental sound only.
3. Response at an external microphone at frequencies >1 kHz to a sound probe generated at the earbud speaker in a quiet environment.

A further fit test may also be used whereby a speaker port microphone to external microphone coherence assessment is made at frequencies <3 kHz, this test indicating an extent of isolation and/or environmental noise.

Test 1—Speaker Port Microphone Low Frequency (SPM LF) Magnitude Response to Probe Test 1 corresponds to the methodology for determining quality of fit described above in relation to FIGS. 1 to 12.

Test 1 indicates an extent of a seal between the earbud and the user's ear canal, and relies on a low frequency signal-to-noise ratio (SNR) that is high enough. The SPM LF response in this test is relatively robust across subjects and in moderate to high levels of typical noise.

Figure 22:
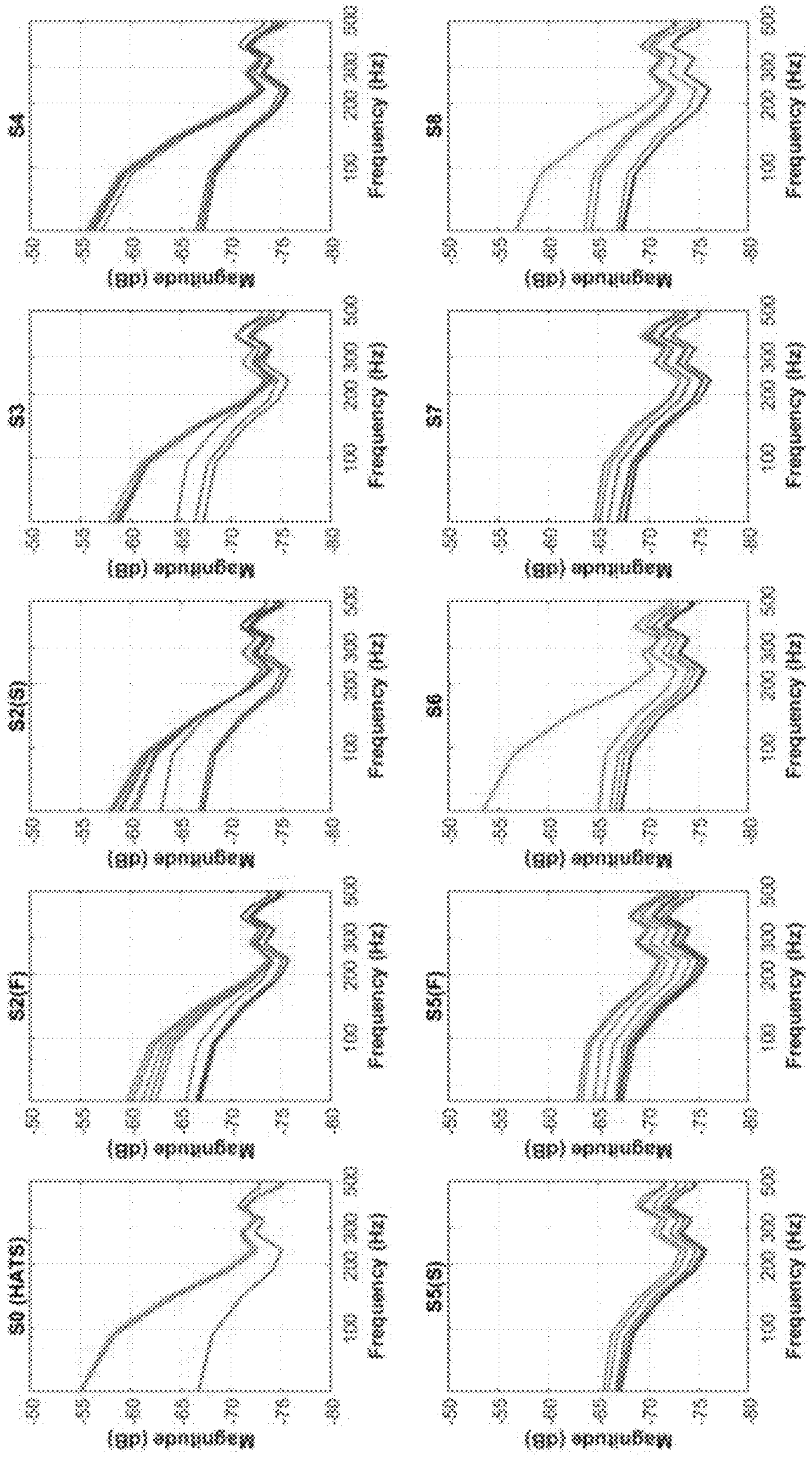
FIG. 22 shows low frequency internal microphone response to an internal sound probe for several subjects and several fits.

FIG. 22 shows the SPM LF magnitude response to a sound probe at a moderate volume level in quiet environmental conditions for several test subjects S2-S8 and several different levels of fit for each test subject.

As indicated by the results in FIG. 22, most subjects exhibit significant increase in SPM LF signal magnitude response with improved fit, including a large step change indicative of the presence of a seal and consequent enhanced low frequency performance.

Test 2—Speaker Port Microphone High Frequency Magnitude Response Vs External Microphone High Frequency Magnitude Response to Environmental Noise (No Probe)

Test 2 indicates the extent of high frequency sound isolation; that is, the extent of leakage of sound from the external environment to the acoustic path.

In the presence of significant environmental noise, the high frequency (HF) fit can be determined by determining the difference of magnitude response to environmental noise between the response at the speaker port microphone and the response at an external microphone, in absence of a probe signal.

Figure 23:
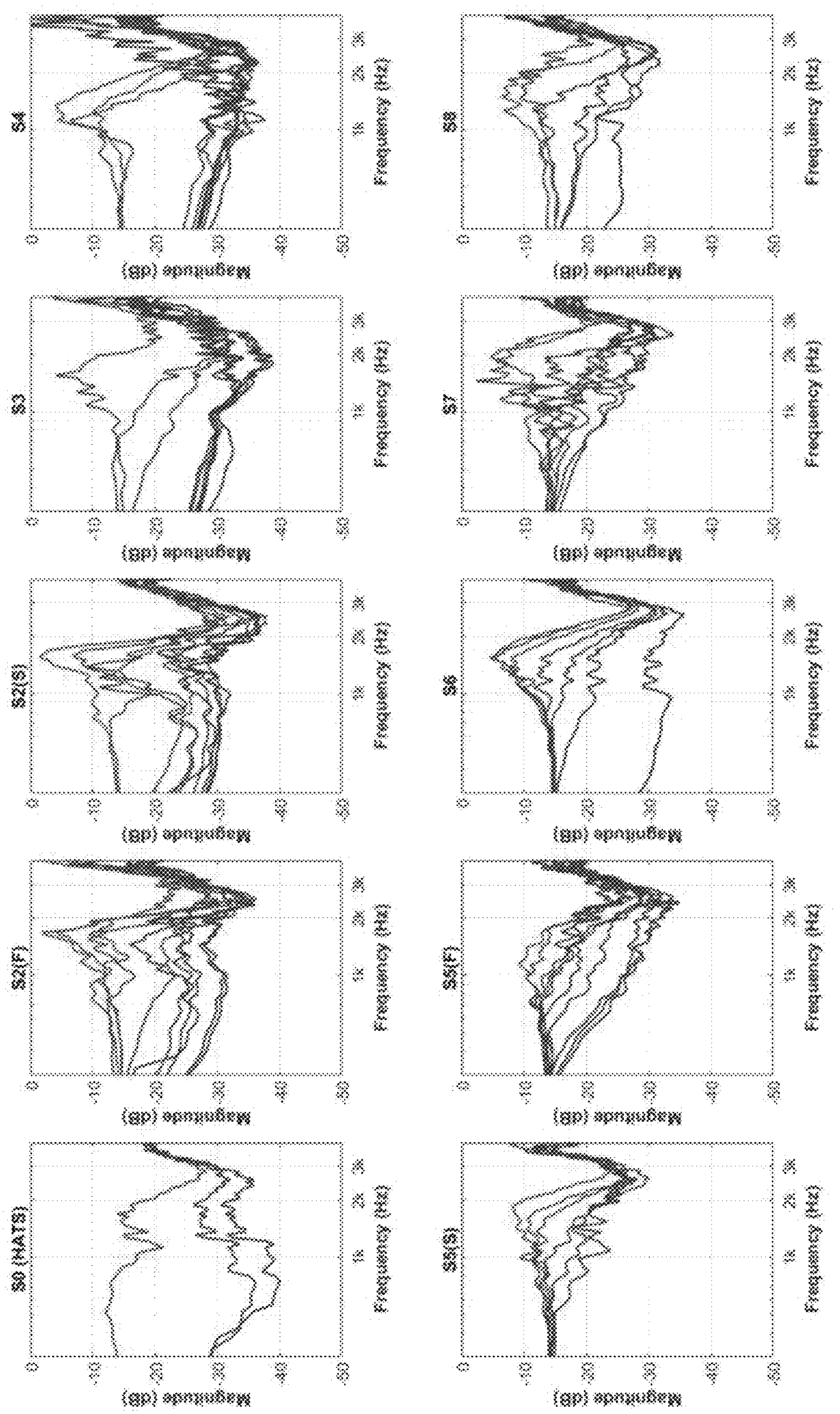
FIG. 23 shows high frequency isolation response to ~65 dBA airport noise for several test subjects and several fits.

FIG. 23 shows this HF isolation response to ~65 dBA airport noise for several test subjects and several different fits. However, it will be appreciated that in order for Test 2 to be feasible, the environmental noise must be sufficiently high, that is, beyond the quiescent noise behaviour of the microphones.

Test 3—External Microphone High Frequency Magnitude Response to a Sound Probe in Quiet Environmental Conditions In relatively quiet environmental conditions, the high frequency (HF) fit cannot be characterised by Test 2. Instead, for quiet environmental conditions, it is possible to use leakage of high frequency sound in response to a sound probe, since the signal-to-noise ratio is sufficiently high in quiet conditions.

Figure 24:
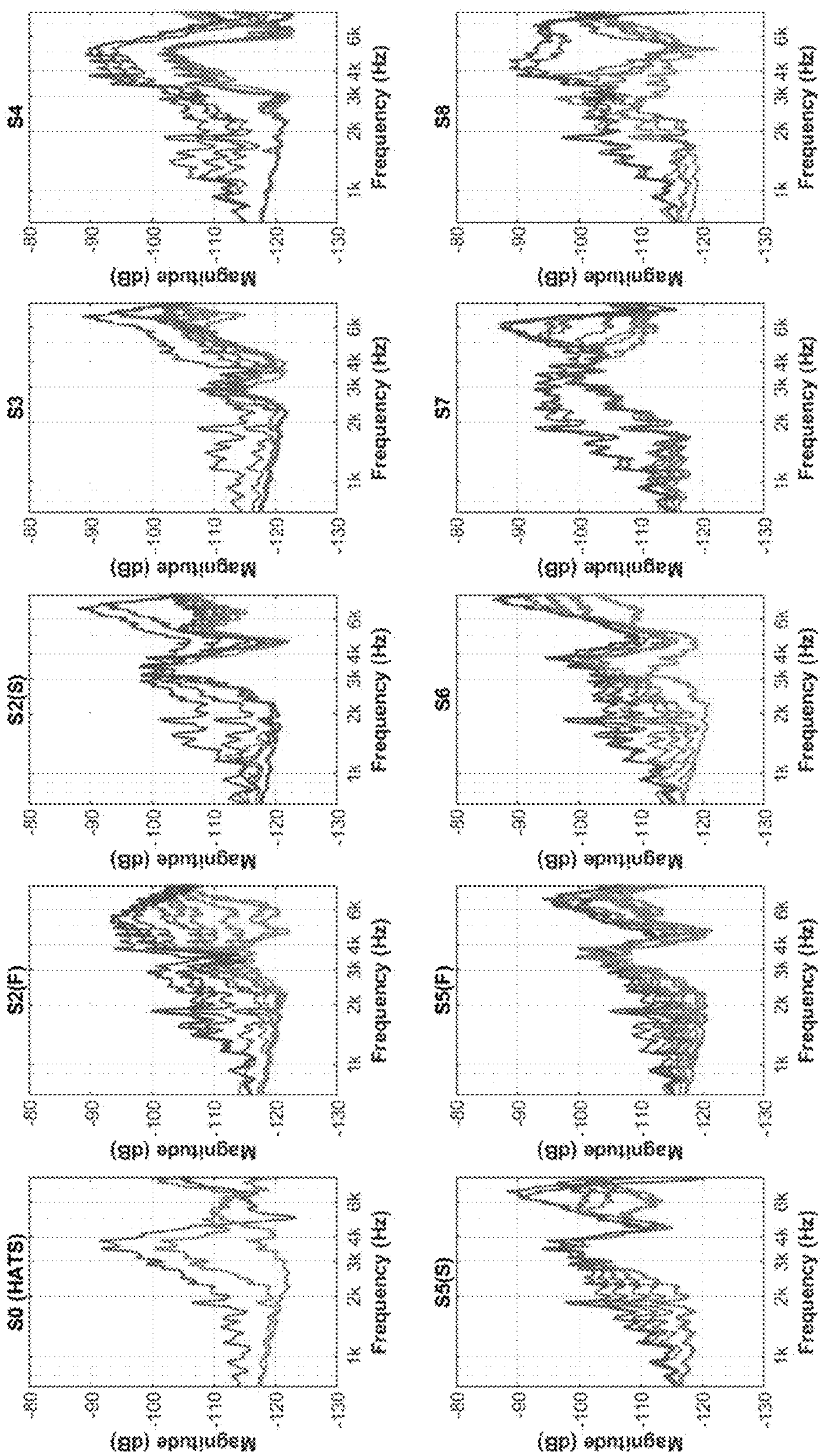
FIG. 24 shows high frequency leakage magnitude responses of an external microphone to an internal sound probe in quiet (lab room) conditions.

FIG. 24 shows HF leakage magnitude responses of an external microphone (in this example a rear external microphone) to a sound probe in quiet (lab room) conditions.

EXAMPLES

Non-limiting Examples will now be described.

The following examples have been performed based on the IQbuds[2] MAX earbuds from Nuheara Limited.

Example 1

Figure 13:
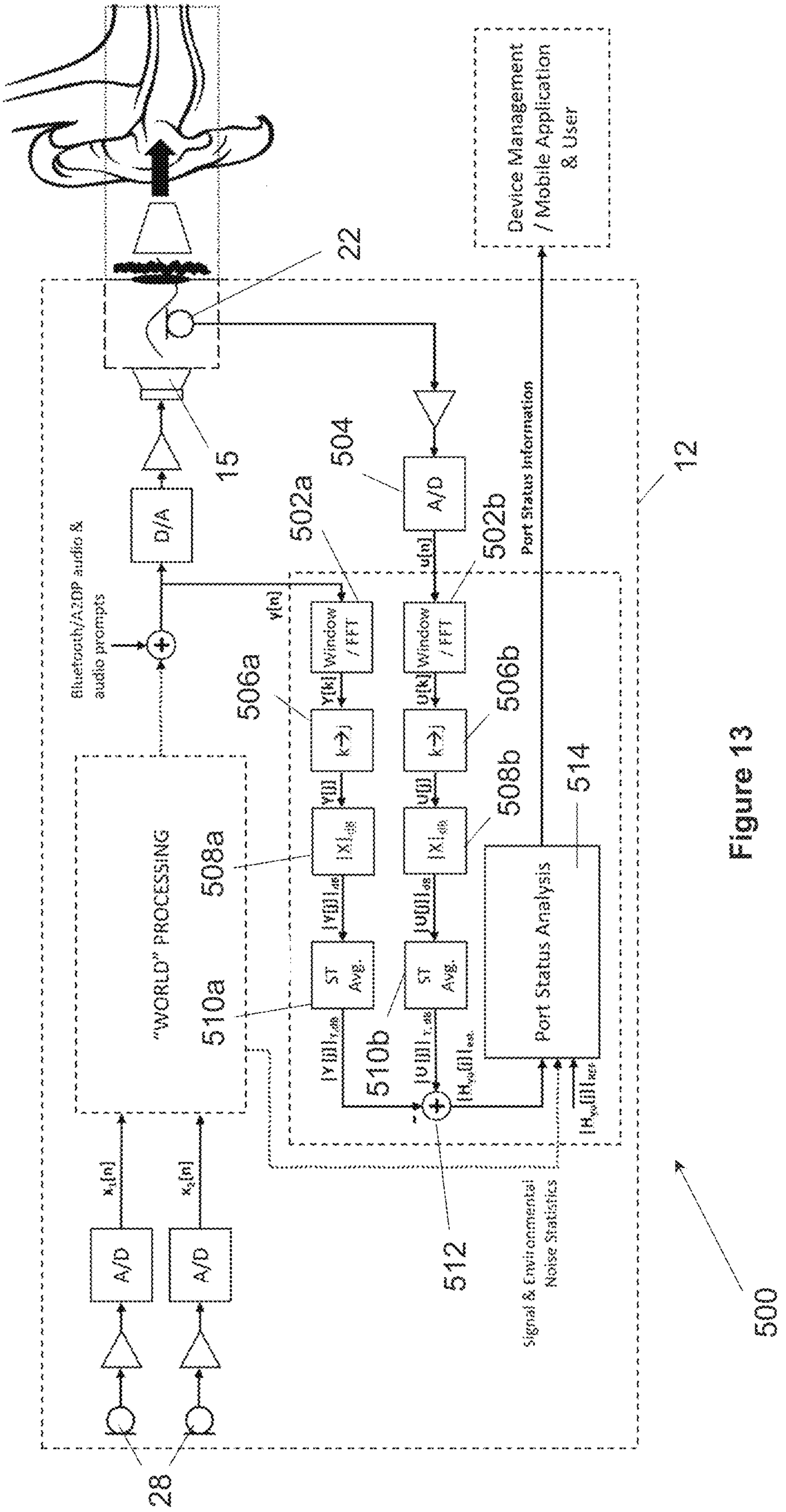
FIG. 13 shows a system architecture of an embodiment of an audio system.

FIG. 13 shows a system architecture 500 of an example audio system. In this example, an estimate of the magnitude response of $H_{yu}$ is calculated ($|H_{yu}[j]|_{est.}$) and compared to a reference ($|H_{yu}[j]|_{REF}$) to produce the acoustic condition data. In this example, the acoustic condition data is analysed to detect earwax blockages and a missing speaker port mesh.

The speaker signal (y) and speaker port microphone (SPM) signal (u) are first analysed using respective window and FFT components 502*a*, 502*b* at a selected frame rate to provide short-time frequency domain analysis outputs (Y[k] & U[k]) in frequency bands k once every frame. Example window and FFT specifications are: fs=24 kHz, FFT N 64~512, overlap 50%, frame period ~1-8 ms. Since the signal received from the SPM 22 is analogue, the microphone signal is converted to digital using an A/D converter 504.

The FFT outputs (Y[k] & U[k]) are then selectively resampled or grouped in the frequency domain (k→j) using respective grouping components 506*a*, 506*b* to obtain values (Y[j] & U[j]) in particular frequency bands of interest j. Using respective magnitude determining components 508*a*,

508*b*, the magnitude in each band of interest is then calculated and converted to the log domain to provide dB unit results ($|Y[j]|_{dB}$ & $|U[j]|_{dB}$). Short time averaging is then performed using respective averaging components 510*a*, 510*b* to smooth and average the band magnitude values over time (($|Y[j]|_{T,dB}$ & $|U[j]|_{T,dB}$). Using a transfer function calculator 512, a magnitude difference is then obtained by subtracting $|Y[j]|_{T,dB}$ from $|U[j]|_{T,dB}$ and an approximate transfer function magnitude response estimate ($|H_{yu}[j]|_{est.}$) calculated.

The transfer function magnitude response estimate $|H_{yu}[j]|_{est.}$ for each frequency band j is then used with corresponding reference values $|H_{yu}[j]|_{REF}$ and environmental noise/signal statistics by a status analyser 514 to determine acoustic condition data and, based on this, speaker port status.

Figure 14:
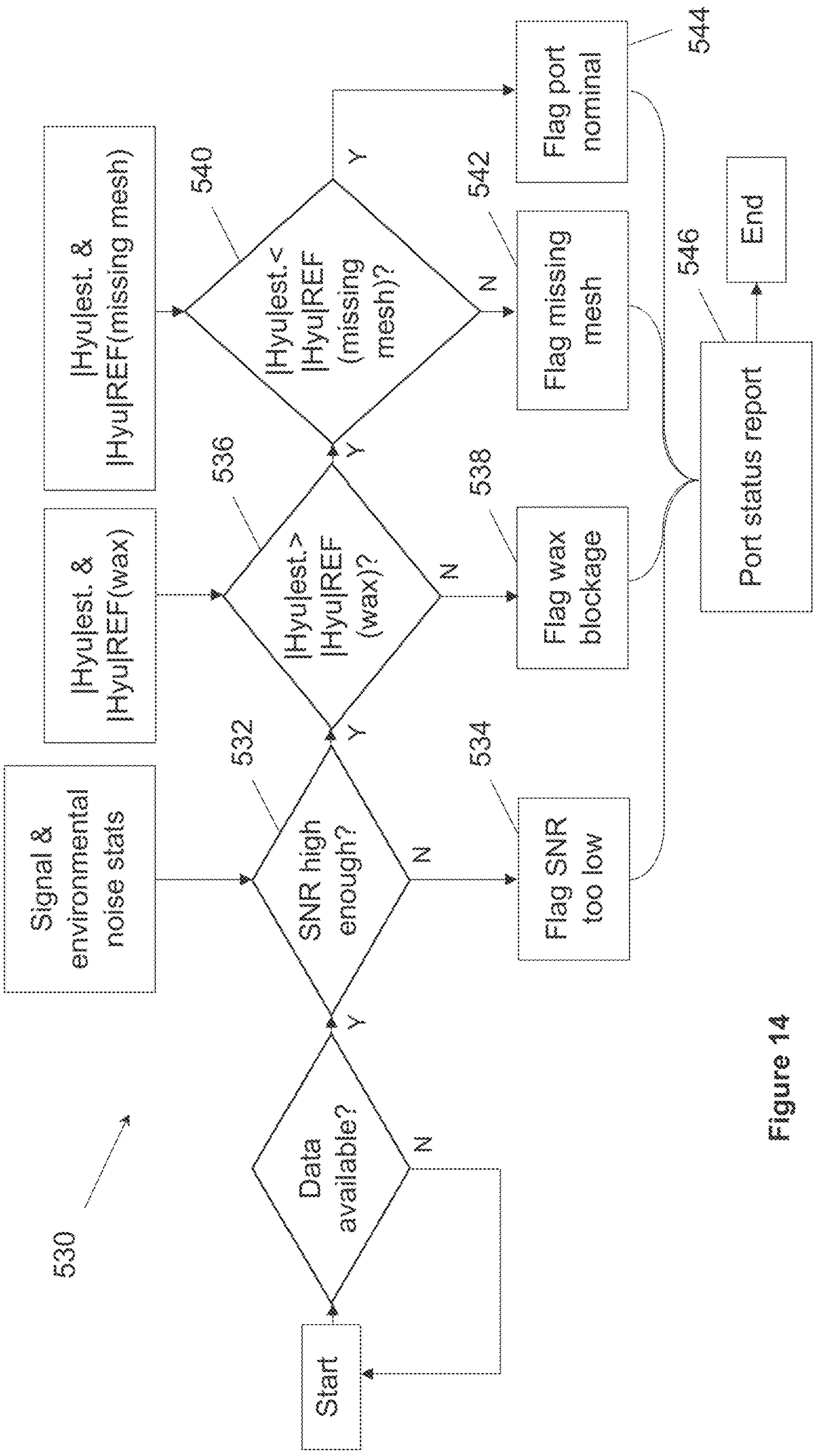
FIG. 14 shows a process flow implemented by the audio system shown in FIG. 13.

An example process 530 implemented by the system architecture 500 is shown in FIG. 14.

As shown in FIG. 14, a check is first carried out to determine whether the signal-to-noise ratio (SNR) at the speaker port microphone 22 is high enough, as indicated at step 532. If the determined SNR is below a defined base threshold, then an indication is generated that the SNR is too low for the test to proceed, as indicated at step 534. If the SNR is higher than the base threshold, a wax test is carried out by comparing the transfer function magnitude response estimate $|H_{yu}[j]|_{est.}$ for each band j in a selected frequency band or range of frequency bands with corresponding reference transfer function magnitude responses at the selected frequency band(s), as indicated at step 536. If the transfer function magnitude response estimate $|H_{yu}[j]|_{est.}$ for the selected frequency band(s) is less than the corresponding reference transfer function magnitude responses at the selected frequency band(s), an indication is generated that a wax blockage exists, as indicated at step 538. If the transfer function magnitude response estimate $|H_{yu}[j]|_{est.}$ for the selected frequency band(s) is greater than the corresponding reference transfer function magnitude responses at the selected frequency band(s), a wax blockage is not considered to exist and a further test is carried out wherein the transfer function magnitude response estimate $|H_{yu}[j]|_{est.}$ for each band j in a different selected frequency band or range of frequency bands is compared with corresponding reference transfer function magnitude responses at the further selected frequency band(s), as indicated at step 540. If the transfer function magnitude response estimate $|H_{yu}[j]|_{est.}$ for the further selected frequency band(s) is greater than the corresponding reference transfer function magnitude responses at the further selected frequency band(s), an indication is generated that the filter mesh is missing, as indicated at step 542. If the transfer function magnitude response estimate $|H_{yu}[j]|_{est.}$ for the selected frequency band (s) is less than the corresponding reference transfer function magnitude responses at the further selected frequency band (s), a missing filter mesh is not considered to exist and an indication is generated that the speaker port is considered to be normal, as indicated at step 544. As indicated at step 546, a status report may be generated that summarises the results of the SNR, wax and filter mesh tests.

Example 2

In example 2, an abnormal condition is determined with reference to changes in the sound transfer function $H_{yu}$ by comparing the magnitude and phase of the determined sound transfer function ($|H_{yu}[j]|_{est.}$ & $\varphi_{Hyu}[j]_{est}$) with a reference magnitude and phase transfer function ($|H_{yu}[j]|_{REF}$ & $\varphi_{Hyu}[j]_{REF}$). As with Example 1, the acoustic condition data is analysed to detect earwax blockages and a missing speaker port mesh.

Figure 15:
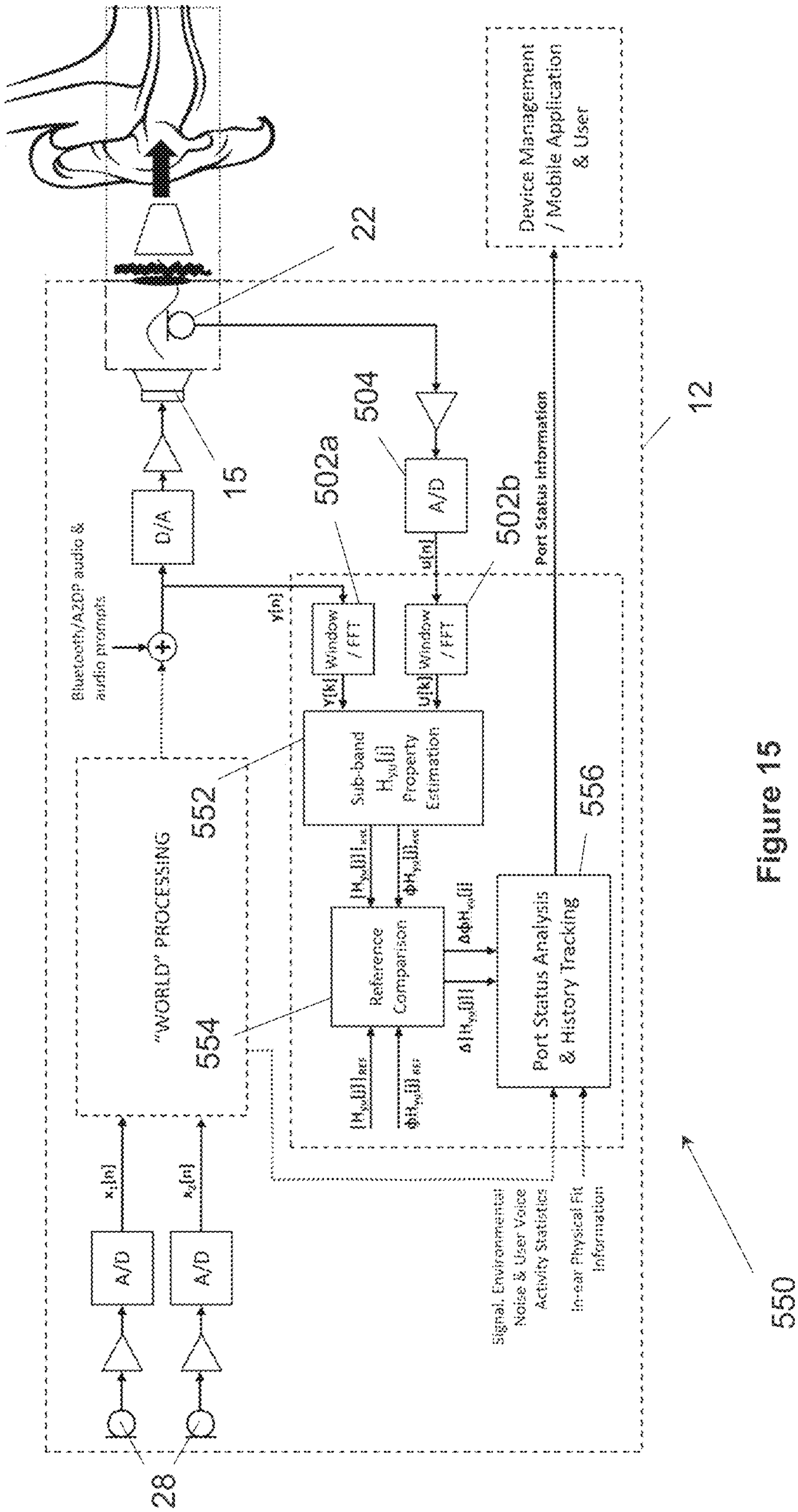
FIG. 15 shows a system architecture of a further embodiment of an audio system.

FIG. 15 shows a system architecture 550 of a further example audio system. Like and similar features are indicated with like reference numerals. In this example, magnitude and phase responses of the $H_{yu}$ transfer functions ($|H_{yu}[j]|_{est.}$ & $\varphi_{Hyu}[j]_{est.}$) are used to determine existence of an abnormal condition. By using both magnitude and phase components of the transfer function, more reliable and comprehensive port status information can be obtained.

The speaker signal (y) and SPM signal (u) are first analysed using respective window and FFT components 502*a*, 502*b* in a similar way to Example 1 to produce short-time frequency domain analysis outputs (Y[k] & U[k]) in frequency bands k. The transfer function $H_{yu}$ is then estimated by an estimator 552 using power spectra as follows:

$$H_{yu}[k] = \frac{P_{uy}[k]}{P_{yy}[k]}$$

where:

$P_{uy}[k]$ is a complex cross-power spectral value for y and u in band k, calculated as follows:

$$\mathrm{re}(P_{uy}[k])=\mathrm{re}(U[k])\times\mathrm{re}(Y[k])+\mathrm{im}(U[k])\times\mathrm{im}(Y[k])$$

$$\mathrm{im}(P_{uy}[k])=\mathrm{im}(U[k])\times\mathrm{re}(Y[k])-\mathrm{re}(U[k])\times\mathrm{im}(Y[k])$$

$P_{yy}[k]$ is a real auto-power spectral value for y in band k, calculated as follows:

$$P_{yy}[k]=\mathrm{re}(Y[k])^2+\mathrm{im}(Y[k])^2$$

The magnitude and phase response estimates ($|H_{yu}[k]|_{est.}$ & $\varphi_{Hyu}[k]_{est.}$) are then calculated via approximations of standard calculations, as follows:

$$|H_{yu}[k]|_{est,dB}=10\ \log_{10}(\mathrm{re}(H_{yu}[k])^2+\mathrm{im}(H_{yu}[k])^2)$$

$$\Phi_{H_{yu}}[k]_{est}=\arg(H_{yu}[k])=\mathrm{atan}\ 2(\mathrm{im}(H_{yu}[k]),\mathrm{re}(H_{yu}[k]))$$

Frequency bands are then allocated and combined with bands of interest j to produce final transfer function magnitude and phase estimates $|H_{yu}[j]|_{est.}$& $\varphi_{Hyu}[j]_{est.}$. These transfer function estimates are then compared to reference transfer functions $|H_{yu}[j]|_{REF}$ & $\varphi_{Hyu}[j]_{REF}$ at the bands of interest j using a comparator 554 to produce difference values at the bands of interest j $\Delta|H_{yu}[j]|$ & $\Delta\varphi_{Hyu}[j]$. The difference values are then used with reference difference values and environmental noise/signal statistics by a status analyser 556 to determine speaker port status.

Example 3

In Example 3, an abnormal condition is determined by indirectly determining changes in the sound transfer function $H_{yu}$. As with Examples 1 and 2, the acoustic condition data is analysed to detect earwax blockages and a missing speaker port mesh.

Figure 16:
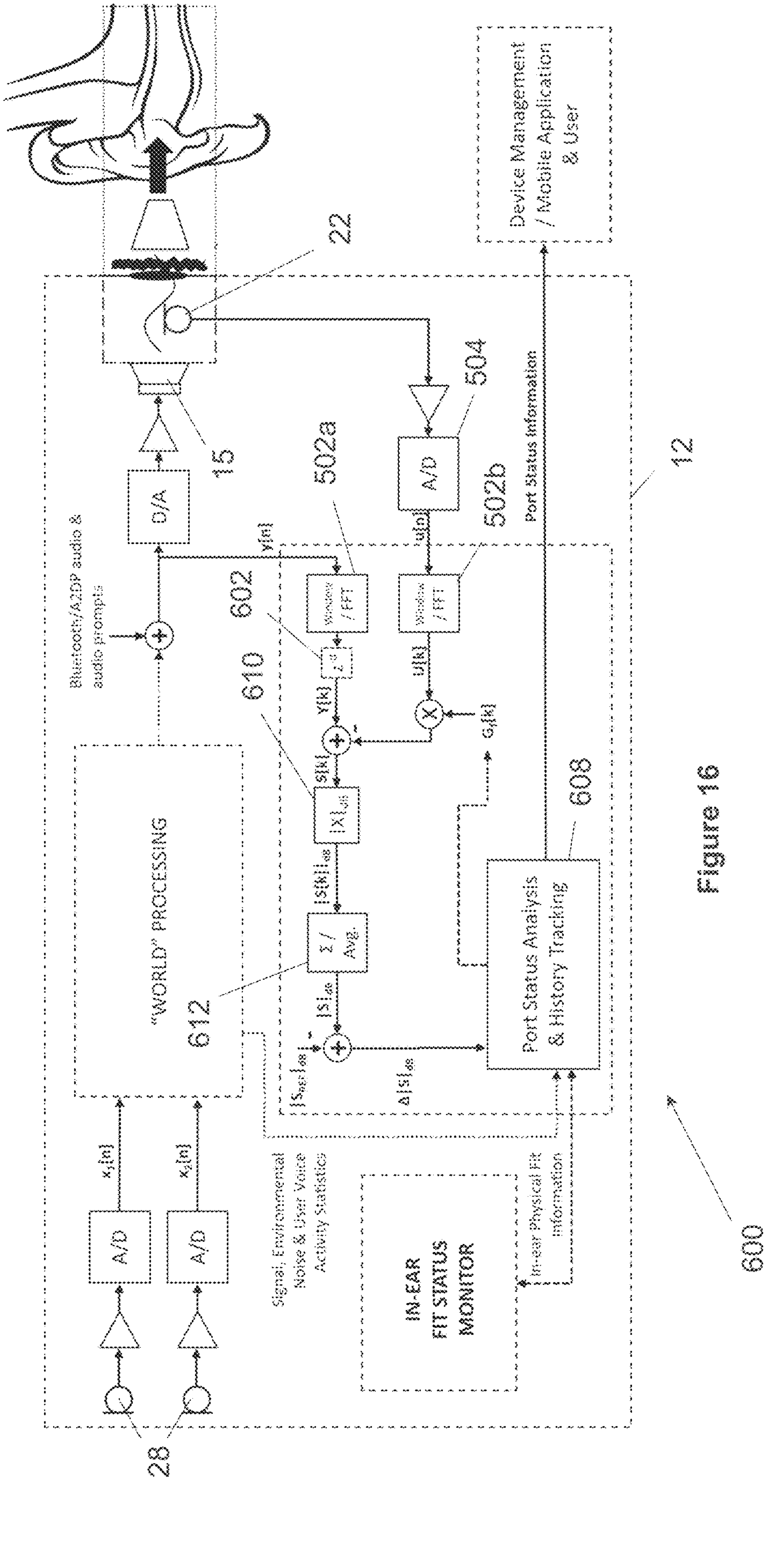
FIG. 16 shows a system architecture of a further embodiment of an audio system.

FIG. 16 shows a system architecture 600 of a further example audio system. Like and similar features are indicated with like reference numerals. In this example, the system architecture 600 is arranged to analyse a residual analysis signal s determined by subtracting a filtered version of the speaker port microphone (SPM) signal u using filter $g_f$ from the speaker output signal y. The residual analysis signal constitutes acoustic data that is indicative of changes to the transfer function $H_{yu}$. The speaker signal (y) and SPM signal (u) are first analysed using respective window and FFT components 502*a*, 502*b* in a similar way to Examples 1 and 2 to produce short-time frequency domain analysis outputs (Y[k] & U[k]) in frequency bands k. After delaying the signal output by the speaker FFT component 502*a* by $z^{-d}$ using a delay component 602, speaker and SPT Y[k] and U[k] FFT outputs are produced. The following calculations are then performed by processing components 604, 606:

$$S[k]=Y[k]-G_f[k]\times U[k]$$

$G_f$ is a filter that may be fixed or adaptive. It is intended to compensate for several factors:

- The relatively constant components of the SPM (U)—speaker output (Y) transfer function $H_{uy}$ normally found in the normal (no wax) condition.
- Possible variable components based on detected in-ear fit variation or other factors, as depicted in FIG. 16 and controlled by a port status analysis component 608.

Figure 17:
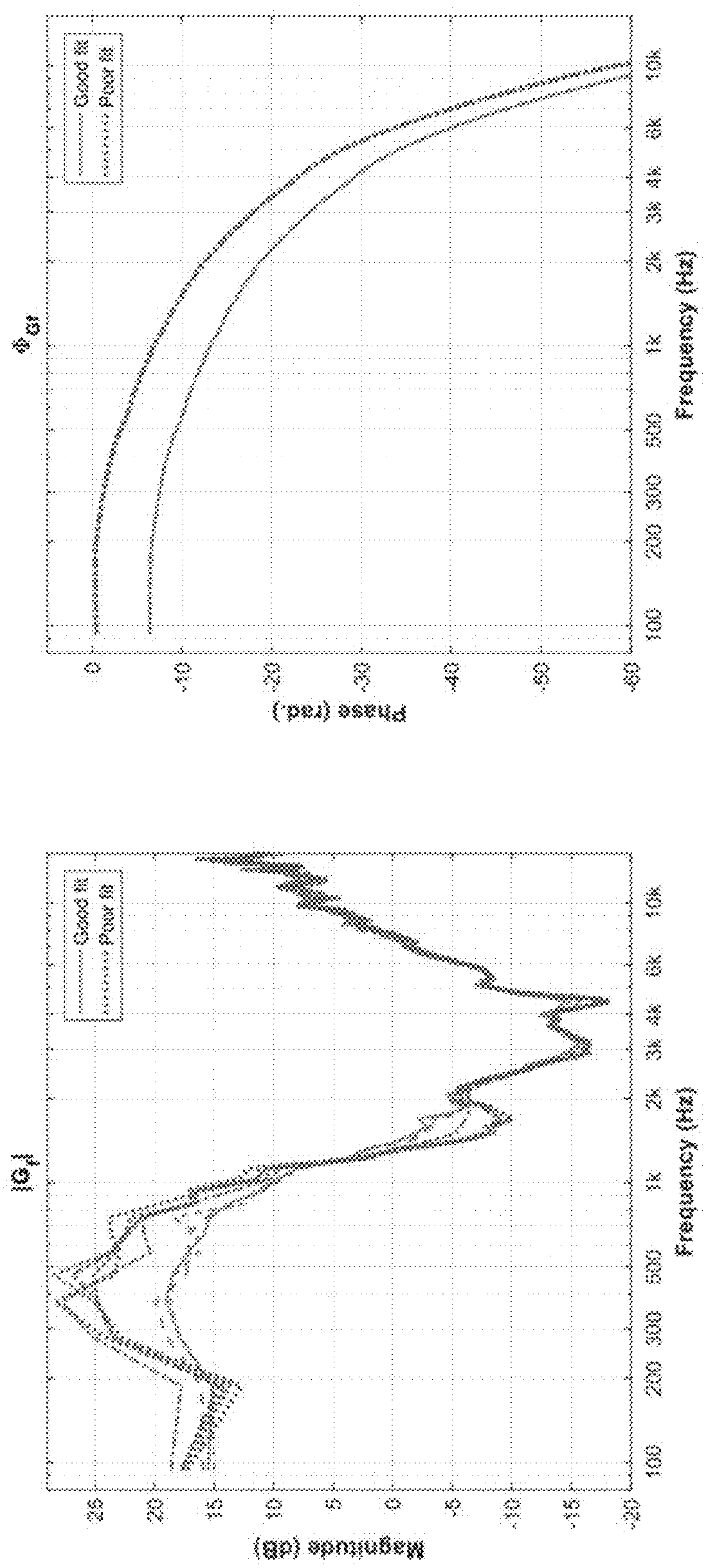
FIG. 17 shows an example of compensation filter Gf magnitude & phase responses for varying in-ear fit based on the system architecture shown in FIG. 16.

The magnitude and phase for a set of device-dependent filters $G_f$ that could be utilised with the described earbuds to allow for varying in-ear fit are exemplified in FIG. 17. Examples of the properties of an analysis signal S that can be found using the system architecture 600 with test data from third and fourth wax tests (good & bad in-ear fits) are shown in FIG. 18, FIG. 19*a* and FIG. 19*b*, respectively.

Figure 18:
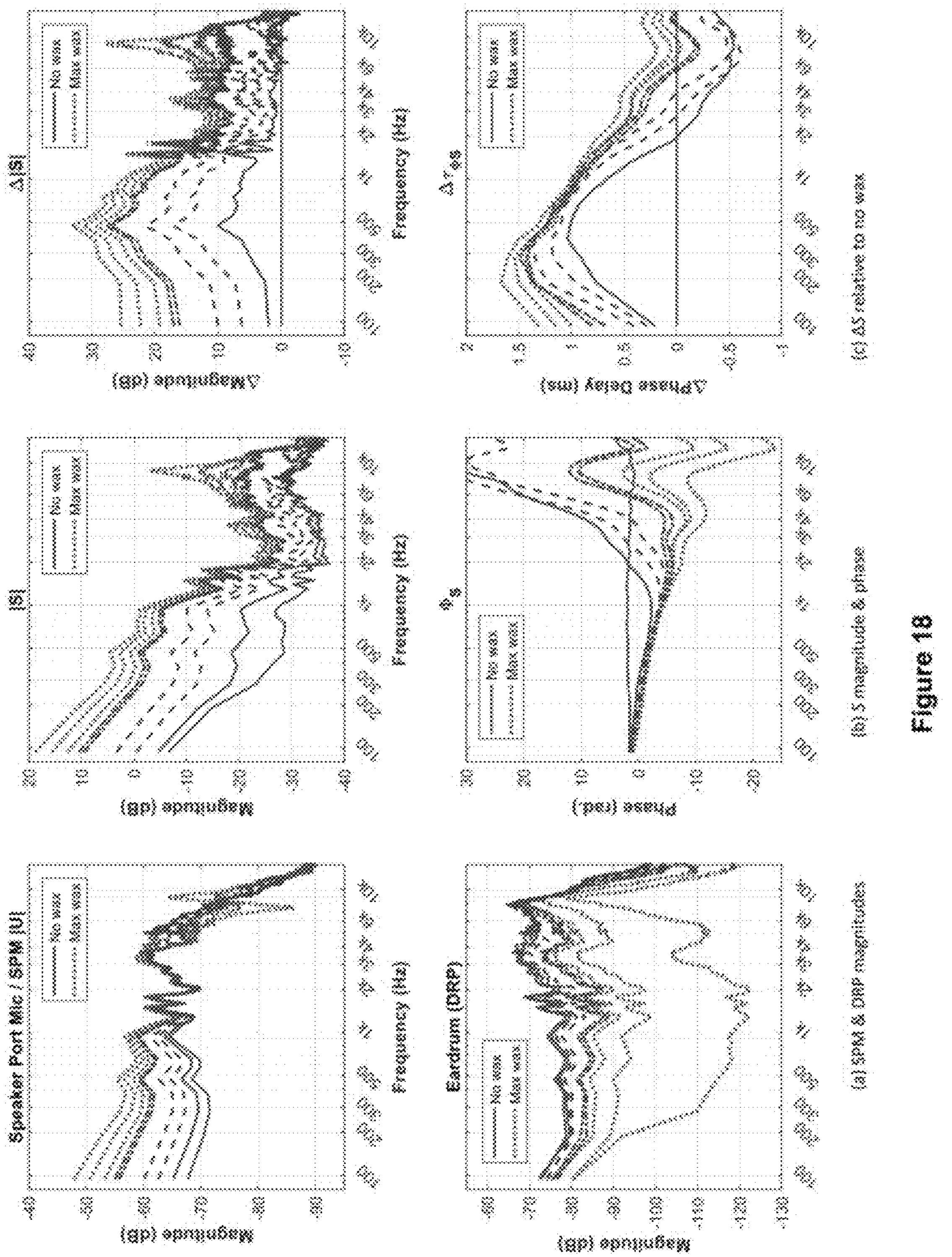
FIG. 18 shows example properties of an analysis signal S determined by the system architecture shown in FIG. 16 for earbud data with varying wax blockages.
Figure 19A:
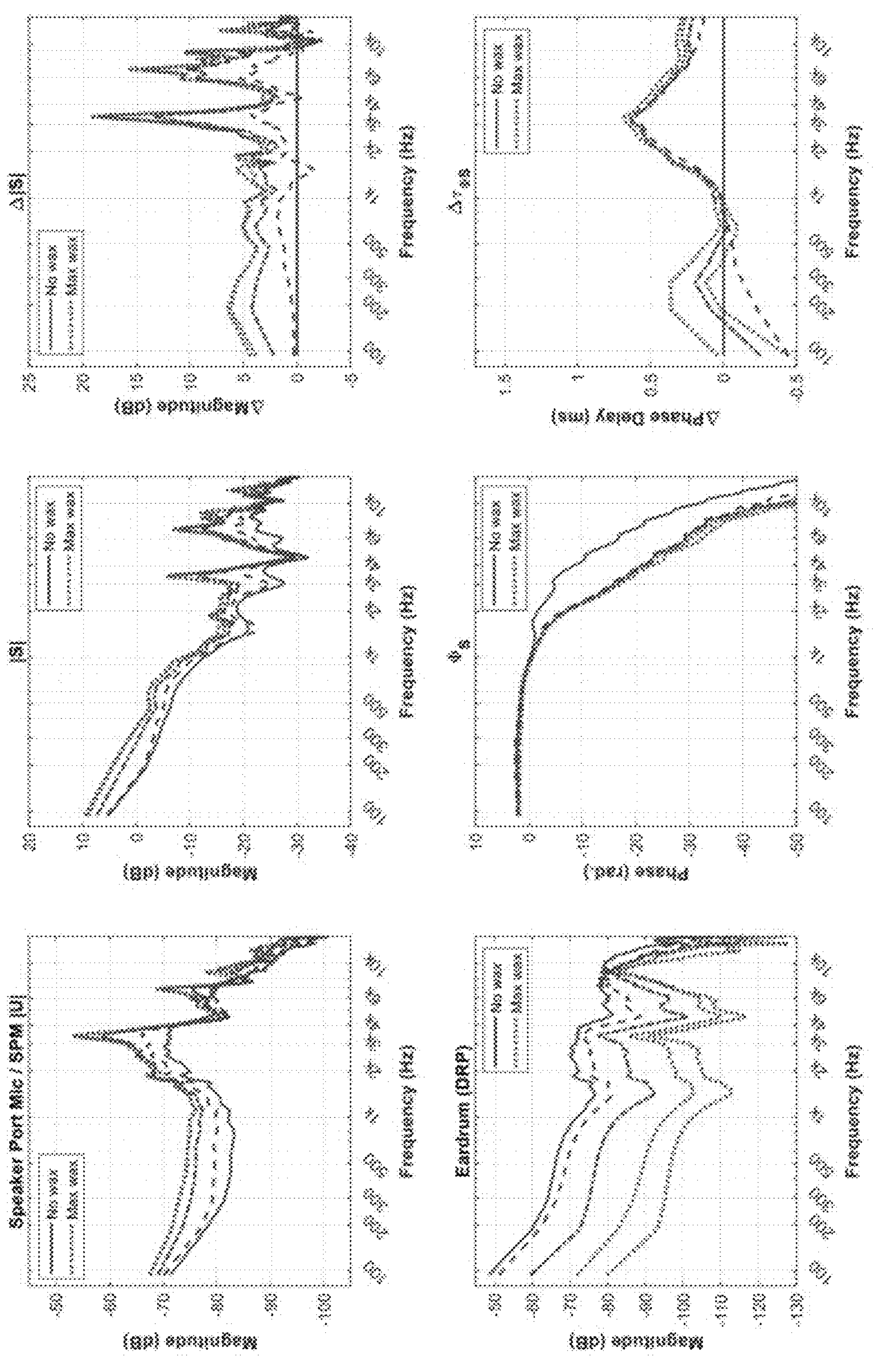
FIG. 19*a* shows example properties of an analysis signal S determined by the system architecture shown in FIG. 16 for earbud data with varying wax blockages.
Figure 19B:
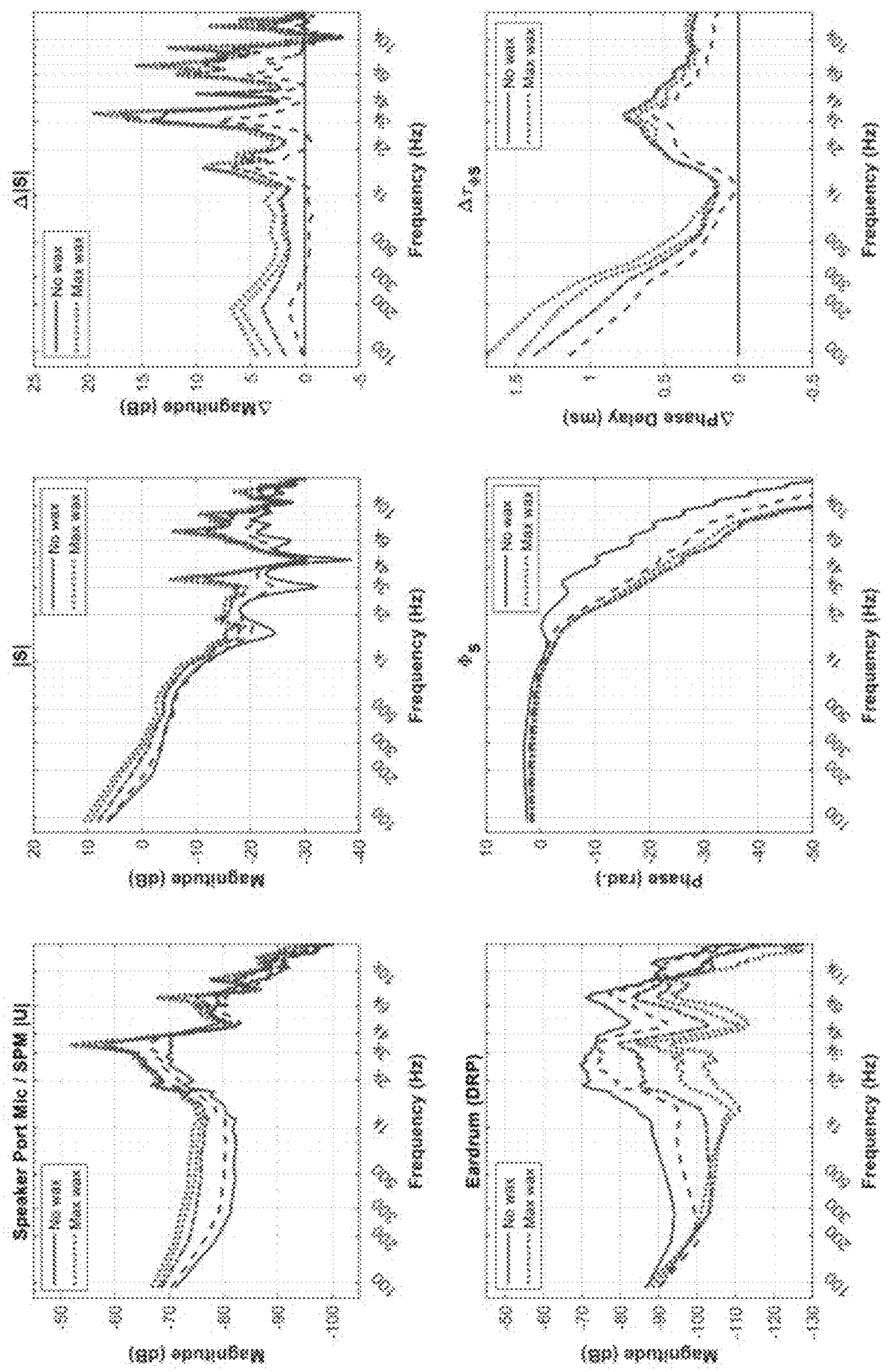
FIG. 19*b* shows example properties of an analysis signal S determined by the method used by the system architecture depicted in FIG. 16, for earbud data with varying wax blockages.

The properties of the analysis signal S exhibited in FIG. 18, FIG. 19*a* and FIG. 19*b* are robust across a range of conditions given appropriate selection and control of the compensation filter $G_f$. As can be seen, signal S can provide a strong basis to characterise the presence and severity of wax blockages or other issues affecting the speaker port and SPM response. In particular, S exhibits easily observable changes that can be used to detect and characterise the wax blockage, and is potentially more consistent and robust than the relatively direct $H_{yu}$ transfer function analyses performed in examples 1 and 2.

The processing steps required to calculate S in system architecture 600 are also typically simpler than the typical processing requirements for the $H_{yu}$ transfer function property estimations in Examples 1 and 2.

For example, while in the system architecture 600 of Example 3 additional steps of magnitude response calculation ($|X|_{dB}$) 610, and time/frequency summation and averaging (Σ/avg) 612 are required to calculate overall broadband or sub-band quantity(ies) of interest $|S|_{dB}$, after $|S|_{dB}$ values are calculated, they can simply be compared with reference levels or thresholds $|S_{REF}|_{dB}$ to provide characteristic data $\Delta|S|_{dB}$ which is then provided to the port status analysis component 608 for final evaluation.

It will be appreciated that the system architecture 600 only uses magnitude response information of S (|S|) and does not use phase information. As FIG. 18, FIG. 19*a* and FIG. 19*b* demonstrate, the phase properties of S, particularly the deviations from a nominal (no wax condition) expressed as a change in phase delay $\Delta_{T_{\phi S}}$, can also provide very useful information to characterise wax blockages or other issues, and also potentially provide additional information regarding in-ear fit. In particular, changes in the low frequency phase response of S can provide an indicator relevant to in-ear fit, as can be seen by comparing the $\Delta_{T_{\phi S}}$ phase delay plots in FIG. 19*a* and FIG. 19*b* (good vs poor fit).

Example 4

Figure 20:
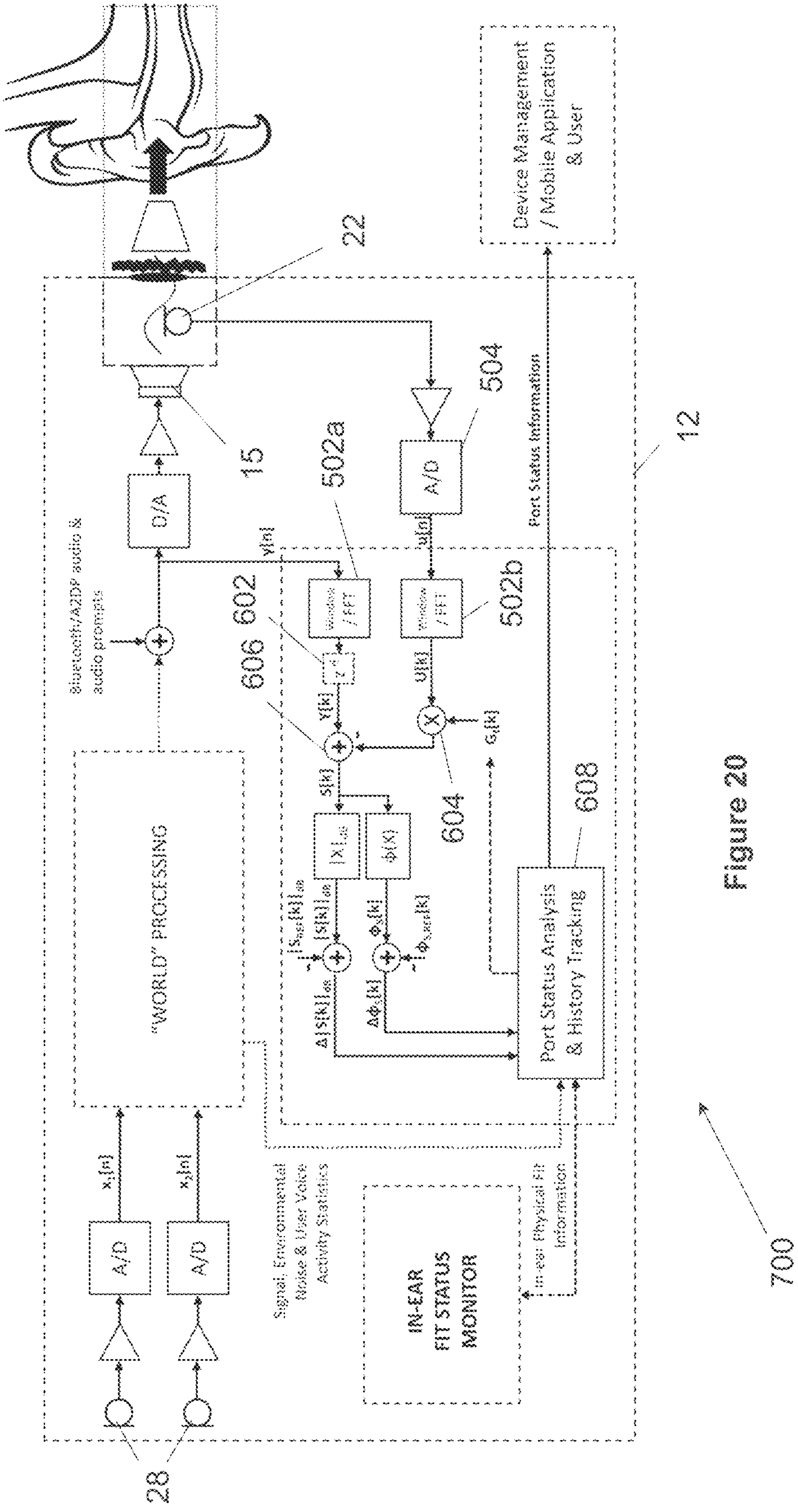
FIG. 20 shows a system architecture of a further embodiment of an audio system.

Reference is now made to system architecture 700 in FIG. 20. The system architecture 700 expands on the system architecture 600 of Example 3 in that phase information from the analysis signal S is also used. In this example, a step of time/frequency summation and averaging of the resultant S characteristics has been removed. Like and similar features are indicated with like reference numerals. As with Examples 1 to 3, the acoustic condition data is analysed to detect earwax blockages and a missing speaker port mesh.

In a simple implementation, the port status analysis component 608 uses the ΔS characteristic change data in a similar manner to the changes in estimated $H_{yu}$ transfer function data as suggested in system architecture 400 and depicted in the flow chart of FIG. 14. In a more sophisticated implementation, the port status analysis component 608 may record a history of values and utilise this further with in-ear fit information to provide more complex port status information as well as additional in-ear fit information output to the in-ear fit status monitor. In yet a further implementation, a port status monitor and an in-ear fit status monitor might be integrated together to work as one component.

Modifications to the system architectures 600 and 700 shown in FIGS. 16 and 20 are also envisaged. For example, a variation could be implemented that applies a compensation filter to the signal Y instead of the signal U. With this arrangement, a comparable residual analysis signal $\hat{S}$ would still be found by taking the difference of the resultant two signals, as follows:

$$\hat{S}[k]=\hat{G}_f[k]\times Y[k]-U[k]$$

Similarly, optional delays $z^{-d}$ could be applied to one or both signals in either time or frequency domain to provide additional compensation of the relative delay properties of each of the signals.

It will be appreciated that since calculation of a residual analysis signal S bears information about the speaker port status, a broad range of analyses of changes in S are possible and could be utilised based on specific application, such as wax blockage, missing mesh, or ear-tip type detection in a device.

Fit Analysis Example

In the Fit Analysis Example, a fit analysis process is carried out on an earbud to determine an indication of fit quality using an overall percentage fit measure. The fit analysis process may be carried out in addition to the processes described above for detecting foreign matter in the acoustic path 20 and/or absence of a filter, or may be carried out as a stand alone fit analysis process.

Figure 25:
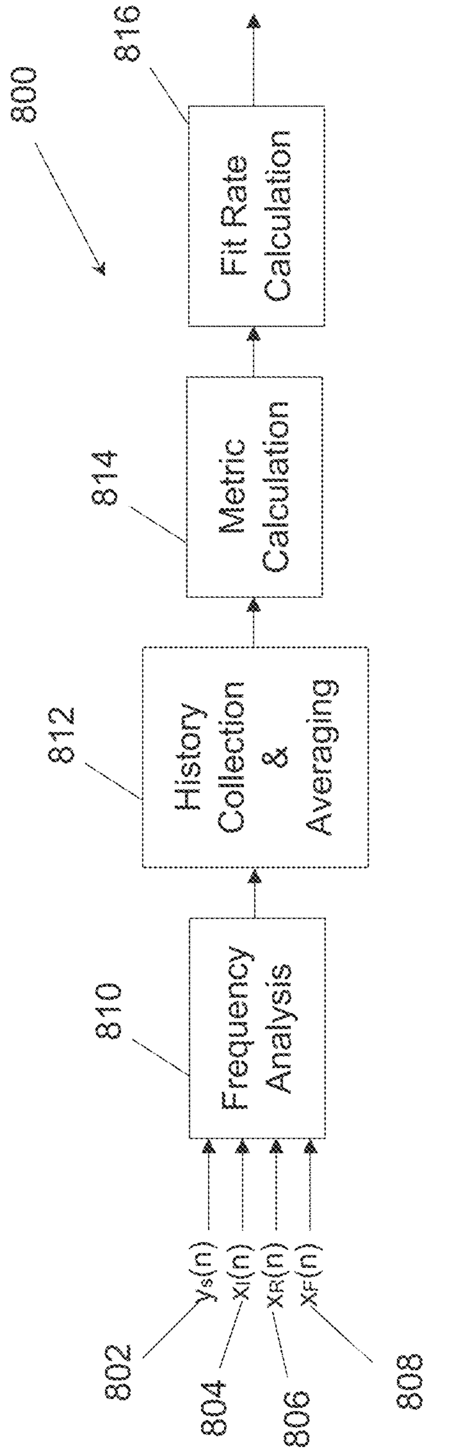
FIG. 25 shows an example system architecture of an audio system according to an embodiment of the present invention.

FIG. 25 illustrates an example system architecture 800 of an example audio system arranged to carry out a fit analysis process.

The architecture 800 receives a speaker signal 802 $y_s(n)$ indicative of a signal supplied to the speaker 15 of an in-ear audio reproducing device, in this example an earbud; a speaker port microphone signal $x_f(n)$ 804 indicative of sound received at the speaker port microphone 22; and an external microphone signal $x_R(n)$ 806 indicative of sound received at the external microphone 28, in this example a rear external microphone. In an alternative embodiment, an external microphone signal $x_F(n)$ 808 indicative of sound received at a further external microphone 28, in this example a front external microphone, may also be received.

A frequency analysis component 810 receives the signals 802, 804, 806 and carries out windowing and FFT functions at a selected frame rate to provide short-time frequency domain analysis outputs, produces magnitude values in each band of interest, and converts the values to the log domain to provide dB unit results.

Using an averaging component 812, short time averaging is then performed to smooth and average the band magnitude values over time. In this example, magnitude averages in the bands of interest are calculated using a two stage averaging process.

In a first stage, short time (for example 20-200 ms) averages are calculated using a simple first order (leaky integrator) filter implemented using linear shift operations directly on dB/log domain numbers.

The short time averages are then sampled and stored as a history value for each of the signals/bands of interest. The history value is averaged to provide overall average results and allow for more accurate characterisation of fit level over a whole test period (eg 6 seconds) during which the probe sound may vary significantly.

A fit metric calculator 814 calculates a primary low frequency (LF) fit metric ($Q_{LF}$) using the relative average low frequency (LF) band magnitude response levels of the speaker port microphone low frequency magnitude response to the probe (corresponding to fit analysis Test 1 described above).

The LF fit metric ($Q_{LF}$) is a relatively robust measure of LF fit so long as low frequency SNR (stimulus sound level to environmental noise level) is sufficiently high. $Q_{LF}$ is calculated according to the following:

$$Q_{LF}=L_{IEM,LF,dB}-L_{S,LF,dB}-C_{SNR,dB}$$

$C_{SNR,dB}$ is a correction applied when LF SNR (to environmental noise) is below a defined threshold that is estimated by comparing stimulus LF sound level to external microphone LF sound level.

A fit rating calculator 816 then calculates a low frequency fit rating $FIT_{LF}$ as a percentage using a direct first order linear function of the LF metric $Q_{LF}$, as follows:

where:

$$\begin{aligned} FIT_{LF} &= (Q_{LF} - Q_{LF,Min})/(Q_{LF,Max} - Q_{LF,Min}) \cdot 100 (Q_{LF,Min} \quad Q_{LF} \quad Q_{LF,Max}) \\ &= 100 (Q_{LF} \quad Q_{LF,Max}) \\ &= 0 (Q_{LF} \quad Q_{LF,Min}) \end{aligned}$$

Where $Q_{LF,Max}$ and $Q_{LF,Min}$ are tuneable parameters setting the limits of the LF fit calculation.

The architecture 800 may also be arranged to determine high frequency fit measures and to use these to determine a final fit rating. For example, the following responses may be determined:

Speaker port microphone high frequency magnitude response vs external microphone high frequency magnitude response to environmental noise (no probe)—fit Test 2 described above; and External microphone high frequency magnitude response to a sound probe in quiet environmental conditions—fit Test 3 described above.

An overall fit rating is determined by the fit rating calculator 816 from a heuristic combination of low frequency and high frequency fit ratings, as follows:

a. Using the low frequency LF fit rating $FIT_{LF}$ as a primary indicator of overall fit rating, considering that lower fit ratings (<50%) better reflect increased variation and significance of HF behaviour to overall fit performance once LF seal is lost; and b. Using some reflection of HF fit performance for higher fit ratings (>50%)

In the claims which follow and in the preceding description of the disclosure, except where context requires otherwise due to expressed language or necessary implications, the word "comprise" or variants such as "comprises" or "comprising" is used in an inclusive sense i.e. to specify the presence of the state features but not to preclude the presence or addition of further features in various embodiments

The invention claimed is:

1. An audio system comprising:

a speaker port defining a speaker port cavity, the speaker port having a speaker port outlet that during use communicates acoustically with an ear canal of a user;

a speaker arranged to generate output sound in the speaker port cavity based on a speaker signal received at the speaker, the output sound travelling along an acoustic path that extends from the speaker through the speaker port outlet to an ear canal during use;

a speaker port microphone in acoustic communication with the speaker port cavity, the speaker port microphone producing a speaker port microphone signal in response to input sound received at the speaker port microphone; and an analysis unit configured to receive the speaker signal and the speaker port microphone signal, to use the speaker signal and the speaker port microphone signal to determine a change in acoustic properties of the acoustic path, and to use the determined change in acoustic properties of the acoustic path to determine a change in physical properties of the audio system along the acoustic path, wherein the change in physical properties of the audio system along the acoustic path indicates a presence of foreign matter in the acoustic path and/or an absence of a filter ordinarily in the acoustic path.

2. The audio system as claimed in claim 1, wherein the analysis unit is configured to use the speaker signal and the speaker port microphone signal to determine acoustic condition data indicative of a change in a transfer function associated with the speaker signal and the speaker port microphone signal.

3. The audio system as claimed in claim 2, wherein the acoustic condition data is determined by:

determining a reference transfer function indicative of expected changes between the speaker signal and the speaker port microphone signal in normal operating conditions of the audio system;

determining a current transfer function indicative of current changes between the speaker signal and the speaker port microphone signal; and determining a difference between the current transfer function and the reference transfer function.

4. The audio system as claimed in claim 2, wherein the acoustic condition data is determined by:

determining a compensation speaker port microphone signal indicative of expected components of the speaker port microphone signal that are associated with expected transfer function components in normal operating conditions of the audio system;

filtering the speaker port microphone signal using the compensation speaker port microphone signal to produce a filtered speaker port microphone signal; and determining a difference between the filtered speaker port microphone signal and the speaker signal.

5. The audio system as claimed in claim 2, wherein the acoustic condition data is determined by:

determining a compensation speaker signal indicative of expected changes to the sound output by the speaker according to an expected transfer function in normal operating conditions of the audio system;

filtering the speaker signal using the compensation speaker signal to produce a filtered speaker signal; and determining a difference between the speaker port microphone signal and the filtered speaker signal.

6. The audio system as claimed in claim 2, wherein the acoustic condition data includes data indicative of a change in magnitude of at least one frequency component of the transfer function.

7. The audio system as claimed in claim 2, wherein the acoustic condition data includes data indicative of a change in phase of at least one frequency component of the transfer function.

8. The audio system as claimed in claim 1, wherein the analysis unit is configured to select at least one frequency of the speaker signal and the speaker port microphone signal and to use the selected at least one frequency of the speaker signal and the speaker port microphone signal to determine a change in acoustic properties of the audio system.

9. The audio system as claimed in claim 8, wherein the audio system is arranged to determine a speaker port microphone signal-to-noise ratio and to use the determined signal-to-noise ratio to select the at least one frequency of the speaker signal to use to determine the change in acoustic properties of the audio system.

10. The audio system as claimed in claim 1, wherein the change in physical properties of the audio system along the acoustic path indicates the presence of foreign matter in the acoustic path.

11. The audio system as claimed in claim 1, wherein the change in physical properties of the audio system along the acoustic path is the absence of the filter ordinarily in the acoustic path.

12. The audio system as claimed in claim 1, wherein the analysis unit is configured to use the speaker signal and the speaker port microphone signal to determine a change in acoustic properties of the audio system indicative of quality of fit between the audio system and a user's ear.

13. The audio system as claimed in claim 1, wherein the speaker signal is indicative of a defined probe sound.

14. The audio system as claimed in claim 1, wherein the speaker signal is indicative of sound produced by the speaker during normal use of the audio system.

15. The audio system as claimed in claim 1, wherein the audio system comprises at least one external microphone arranged to produce an external microphone signal indicative of environmental sound adjacent and external to the audio system.

16. The audio system as claimed in claim 15, wherein the system is arranged to determine quality of fit between the audio system and a user's ear by determining a difference between a high frequency response to the environmental sound at the external microphone and a high frequency response to the environmental sound at the speaker port microphone.

17. The audio system as claimed in claim 15, wherein the system is arranged to determine quality of fit between the audio system and a user's ear by determining a response to a high frequency sound probe generated at the speaker, the response determined at the external microphone in relatively quiet conditions.

18. An in-ear, on-ear or over-ear audio reproducing device including an audio system as claimed in claim 1.

19. A method of determining a change in physical properties of an audio system, the audio system including:

a speaker port defining a speaker port cavity, the speaker port having a speaker port outlet that during use communicates acoustically with an ear canal of a user;

a speaker arranged to generate output sound in the speaker port cavity based on a speaker signal received at the speaker, the output sound travelling along an acoustic path that extends from the speaker through the speaker port outlet to an ear canal during use; and a speaker port microphone in acoustic communication with the speaker port cavity, the speaker port microphone producing a speaker port microphone signal in response to input sound received at the speaker port microphone;

the method comprising:

receiving the speaker signal and the speaker port microphone signal;

using the speaker signal and the speaker port microphone signal to determine a change in acoustic properties of the acoustic path; and using the determined change in acoustic properties of the audio system to determine a change in physical properties of the audio system along the acoustic path, wherein the change in physical properties of the audio system along the acoustic path is a presence of foreign matter in the acoustic path and/or an absence of a filter ordinarily in the acoustic path.

20. The method as claimed in claim 19, comprising using the speaker signal and the speaker port microphone signal to determine acoustic condition data indicative of a change in a transfer function associated with the speaker signal and the speaker port microphone signal.

21. The method as claimed in claim 20, comprising determining the acoustic condition data by:

determining a reference transfer function indicative of expected changes between the speaker signal and the speaker port microphone signal in normal operating conditions;

determining a current transfer function indicative of current changes between the speaker signal and the speaker port microphone signal; and determining a difference between the current transfer function and the reference transfer function.

22. The method as claimed in claim 20, comprising determining the acoustic condition data by:

determining a reference speaker port microphone signal indicative of expected components of the speaker port microphone signal that are associated with expected transfer function components in normal operating conditions;

filtering the speaker port microphone signal using the reference speaker port microphone signal to produce a filtered speaker port microphone signal; and determining a difference between the filtered speaker port microphone signal and the speaker signal.

23. The method as claimed in claim 20, wherein the acoustic condition data includes data indicative of a change in magnitude of at least one frequency component of the transfer function.

24. The method as claimed in claim 20, wherein the acoustic condition data includes data indicative of a change in phase of at least one frequency component of the transfer function.

25. The method as claimed in claim 19, comprising selecting at least one frequency of the speaker signal and the speaker port microphone signal and using the selected at least one frequency of the speaker signal and the speaker port microphone signal to determine a change in acoustic properties of the audio system.

26. The method as claimed in claim 19, comprising determining a speaker port microphone signal-to-noise ratio and using the determined signal-to-noise ratio to select the at least one frequency of the speaker signal to use to determine the change in acoustic properties of the audio system.

27. The method as claimed in claim 19, wherein the change in physical properties of the audio system along the acoustic path is the presence of foreign matter in the acoustic path.

28. The method as claimed in claim 19, wherein the change in physical properties of the audio system along the acoustic path is the absence of the filter.

29. The method as claimed in claim 19, comprising using the speaker signal and the speaker port microphone signal to determine a change in acoustic properties of the audio system indicative of quality of fit between the audio system and a user's ear.

30. The method as claimed in claim 19, wherein the speaker signal is indicative of a defined probe sound.

31. The method as claimed in claim 19, wherein the speaker signal is indicative of sound produced by the speaker during normal use of the audio system.

32. The method as claimed in claim 19, wherein the audio system comprises at least one external microphone and the method comprises determining quality of fit between the audio system and a user's ear by determining a difference between a high frequency response to environmental noise at the external microphone and a high frequency response to environmental noise at the speaker port microphone.

33. The method as claimed in claim 19, wherein the audio system comprises at least one external microphone and the method comprises determining quality of fit between the audio system and a user's ear by determining a response to a high frequency sound probe generated at the speaker, the response determined at the external microphone in relatively quiet conditions.

* * * * *